United States Patent
Amadjikpe

(10) Patent No.: US 11,360,210 B2
(45) Date of Patent: Jun. 14, 2022

(54) MULTI-MODE MULTI-INPUT MULTI-OUTPUT (MIMO) RADAR SENSORS

(71) Applicant: Intel Corporation, Santa Clara, CA (US)

(72) Inventor: Arnaud L. Amadjikpe, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 16/460,686

(22) Filed: Jul. 2, 2019

(65) Prior Publication Data

US 2019/0324136 A1 Oct. 24, 2019

(51) Int. Cl.

| | |
|---|---|
| *G01S 13/931* | (2020.01) |
| *G01S 13/70* | (2006.01) |
| *G01S 13/84* | (2006.01) |
| *H04B 7/0426* | (2017.01) |
| *G01S 13/02* | (2006.01) |

(52) U.S. Cl.
CPC ........... *G01S 13/931* (2013.01); *G01S 13/70* (2013.01); *G01S 13/84* (2013.01); *H04B 7/0434* (2013.01); *G01S 2013/0254* (2013.01)

(58) Field of Classification Search
CPC ........ G01S 13/931; G01S 13/70; G01S 13/84; G01S 2013/0254; H04B 7/0434
USPC .......................................................... 342/70
See application file for complete search history.

(56) References Cited

U.S. PATENT DOCUMENTS

| | | | | |
|---|---|---|---|---|
| 4,739,330 | A | * 4/1988 | Lazarus | G01S 7/034 342/122 |
| 5,559,519 | A | * 9/1996 | Fenner | G01S 7/4052 342/174 |
| 6,147,638 | A | * 11/2000 | Rohling | G01S 13/28 342/104 |
| 9,397,820 | B2 | * 7/2016 | Schulz | H04L 5/14 |
| 10,203,405 | B2 | * 2/2019 | Mazzaro | G01S 13/103 |
| 10,218,550 | B1 | * 2/2019 | Kim | H04B 7/0617 |

(Continued)

FOREIGN PATENT DOCUMENTS

| | | | | |
|---|---|---|---|---|
| EP | | 3244231 A1 * 11/2017 | ............. | G01S 13/89 |
| WO | WO-2018051288 A1 | * 3/2018 | ........... | G01S 13/931 |

(Continued)

*Primary Examiner* — Bernarr E Gregory
*Assistant Examiner* — Nuzhat Pervin
(74) *Attorney, Agent, or Firm* — Hanley, Flight & Zimmerman, LLC

(57) ABSTRACT

Multi-mode multi-input multi-output (MIMO) radar sensors are described herein. An example MIMO radar sensor includes a receiver module including an array of receiver antenna elements to receive radar signals and a transmitter module including an array of transmitter antenna elements. Groups of the transmitter antenna elements form transmitter chains. The example MIMO radar sensor further includes a control system to, in a first mode, activate a first set of the transmitter antenna elements of each of the transmitter chains, and, in a second mode, activate a second set of the transmitter antenna elements of each of the transmitter chains, where the second set is larger than the first set. The transmitter antenna elements are arranged such that distances between phase centers of the transmitter chains in the first mode and the second mode are the same.

26 Claims, 14 Drawing Sheets

(56) References Cited

U.S. PATENT DOCUMENTS

| | | | | |
|---|---|---|---|---|
| 10,873,385 B2* | 12/2020 | Hwang | | H04B 7/0486 |
| 2006/0262007 A1* | 11/2006 | Bonthron | | G01S 13/44 |
| | | | | 342/70 |
| 2009/0103593 A1* | 4/2009 | Bergamo | | H04J 13/00 |
| | | | | 375/146 |
| 2013/0057432 A1* | 3/2013 | Rajagopal | | H01Q 3/26 |
| | | | | 342/368 |
| 2013/0088383 A1* | 4/2013 | Forstner | | G01S 7/02 |
| | | | | 342/175 |
| 2014/0347211 A1* | 11/2014 | Schoor | | G01S 13/931 |
| | | | | 342/147 |
| 2015/0260836 A1* | 9/2015 | Hayakawa | | H01Q 13/206 |
| | | | | 342/70 |
| 2016/0131742 A1* | 5/2016 | Schoor | | H01Q 25/00 |
| | | | | 342/128 |
| 2016/0204840 A1* | 7/2016 | Liu | | G01S 13/904 |
| | | | | 375/267 |
| 2016/0285611 A1* | 9/2016 | Fischer | | H04W 16/14 |
| 2017/0115384 A1* | 4/2017 | Loesch | | G01S 13/343 |
| 2018/0041241 A1* | 2/2018 | Trotta | | G01S 13/88 |
| 2018/0088229 A1* | 3/2018 | Rajendran | | G01S 7/285 |
| 2018/0149736 A1* | 5/2018 | Alland | | G01S 13/42 |
| 2018/0156892 A1* | 6/2018 | Villeval | | G01S 13/931 |
| 2018/0321368 A1* | 11/2018 | Bharadwaj | | G01S 13/42 |
| 2019/0293753 A1* | 9/2019 | Iwasa | | G01S 7/03 |
| 2019/0379137 A1* | 12/2019 | Ohguchi | | H01Q 3/24 |
| 2019/0383901 A1* | 12/2019 | Elad | | G01S 15/931 |
| 2020/0072764 A1* | 3/2020 | Vacanti | | G01S 7/026 |
| 2020/0096626 A1* | 3/2020 | Wang | | G01S 13/4454 |
| 2020/0136704 A1* | 4/2020 | Liu | | H04B 7/0626 |
| 2020/0321710 A1* | 10/2020 | Shtrom | | H01Q 21/061 |
| 2020/0395969 A1* | 12/2020 | Vardi | | H03F 3/19 |

FOREIGN PATENT DOCUMENTS

| | | | | |
|---|---|---|---|---|
| WO | WO-2018108359 A1 * | 6/2018 | | G01S 13/003 |
| WO | WO-2019240882 A1 * | 12/2019 | | G01S 13/878 |

* cited by examiner

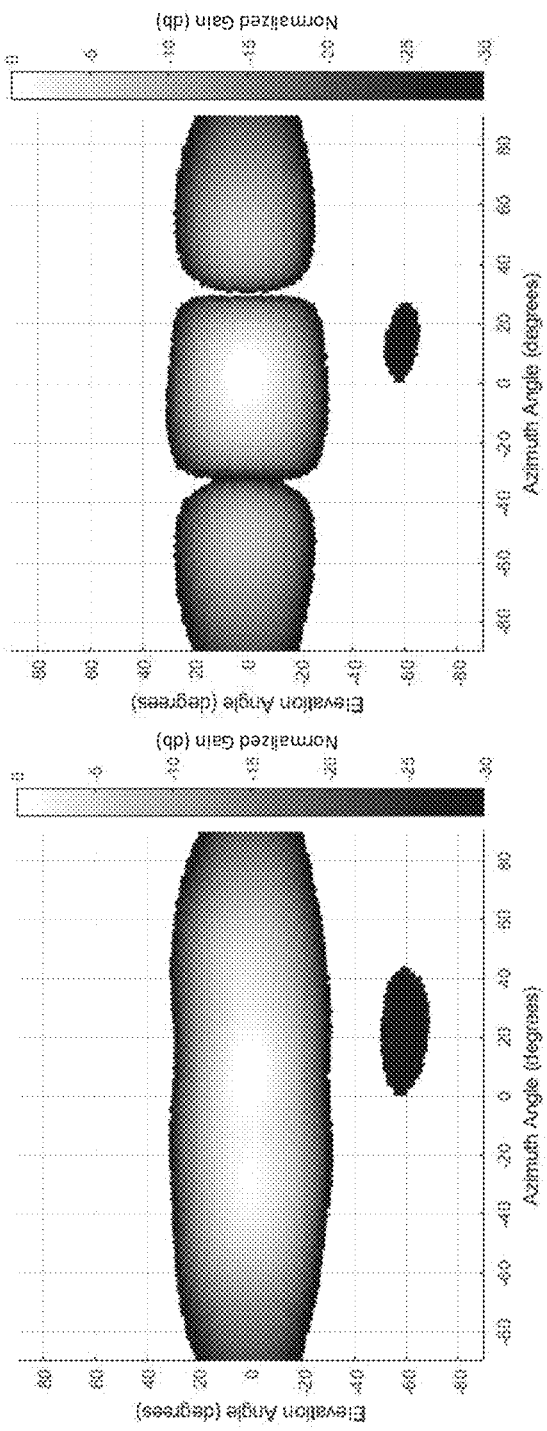
FIG. 6A
FIG. 6B
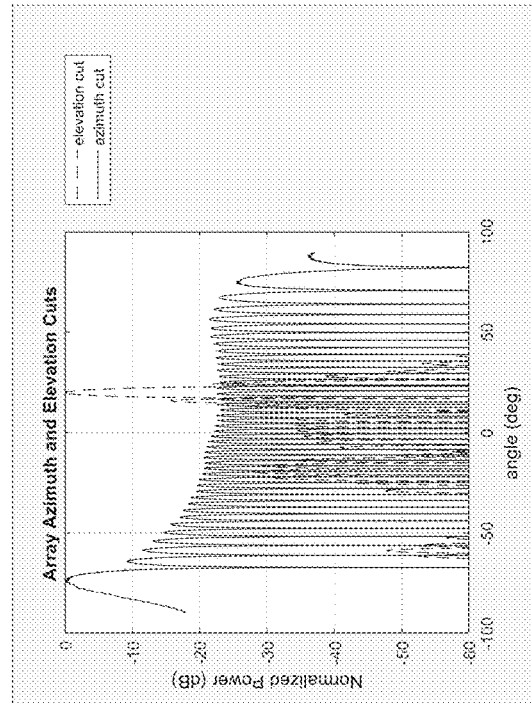
FIG. 7A
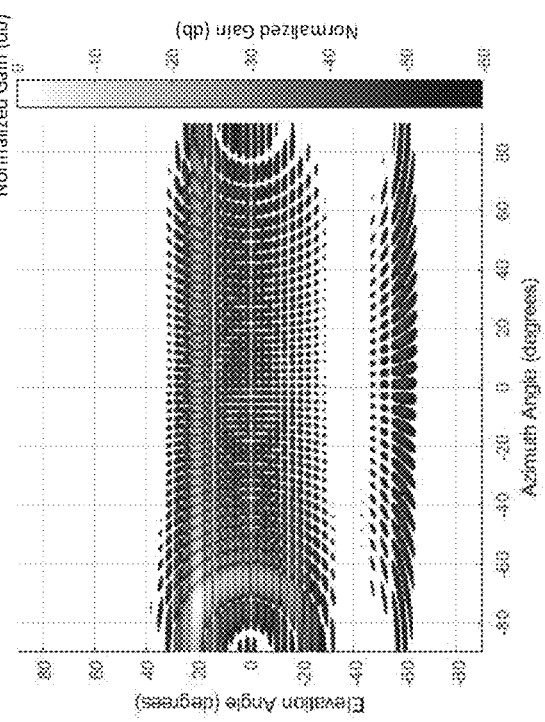
FIG. 7B

MULTI-MODE MULTI-INPUT MULTI-OUTPUT (MIMO) RADAR SENSORS

FIELD OF THE DISCLOSURE

This disclosure relates generally to radar and, more particularly, to multi-mode multi-input multi-output (MIMO) radar sensors.

BACKGROUND

In recent years, autonomous and semi-autonomous vehicle technology has been implemented in more and more vehicles. An important component of this technology is the radar system that helps detect and track objects around the vehicle.

BRIEF DESCRIPTION OF THE DRAWINGS

FIGS. 6A and 6B are graphs showing an element 3D pattern of a field of view generated by the MIMO radar sensor of FIG. 2 in a mid-range radar mode and a long range radar mode, respectively.

FIG. 7A is a graph showing an array 3D pattern generated by the example MIMO radar sensor of FIG. 2 operating in a mid-range radar mode with a digital beamforming at −75° azimuth and +20° elevation.

FIG. 7B is a graph showing the array azimuth and elevation cuts corresponding to the array 3D pattern of FIG. 7A.

Figure 1:
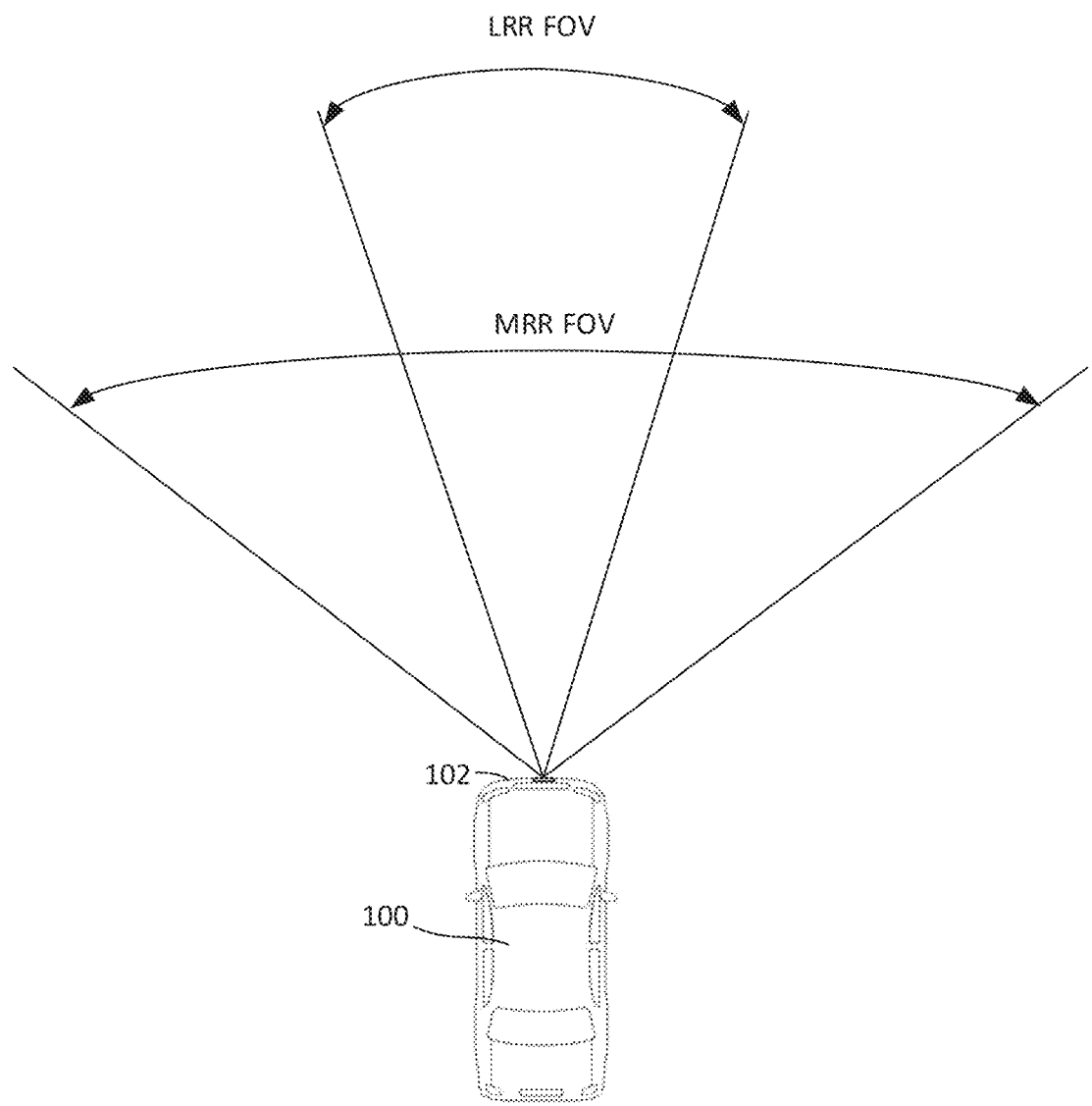
FIG. 1 illustrates an example vehicle in which example multi-input multi-output (MIMO) radar sensors disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Radar systems are used on many vehicles to assist with navigation and collision avoidance. Radar systems are especially important in self-driving (autonomous) vehicles (e.g., self-driving cars). Radar systems are also used on semi-autonomous vehicles to perform driver assist functions, such as lane departure detection, blind spot monitoring, emergency braking, adaptive cruise control, etc. Radar systems not only detect targets in the surrounding area of the vehicle, but radar systems measure range, velocity, and bearing (direction of arrival) of targets. This information is used to help safely operate the vehicle. Radar systems typically include one or more radar sensors having one or more transmitter antennas and one or more receiver antennas. Radar sensors may be disposed on the sides of a vehicle to detect targets in different directions.

In general, the type of driving scenario (e.g., lane change assist, autonomous emergency braking, blind spot monitoring) determines the field of view (or angular coverage) as well as detection range requirements from the radar sensor. As a result, multiple modes of operation of a radar sensor are defined that are usually classified as SRR (short range radar) mode, MRR (mid-range radar) mode and LRR (long range radar) mode. Forward looking and rear looking radars typically must support both MRR and LRR modes, while side looking radars must support both SRR and MRR modes. Table 1 below shows example field of view and detection range requirements in the SRR mode, MRR mode, and LRR mode.

TABLE 1

|  | SRR | MRR | LRR |
| --- | --- | --- | --- |
| Field Of View | 150° | 130° | 40° |
| Detection Range | 50 m | 125 m | 250 m |

Some known radar systems utilize active electronically scanned arrays (AESA) radar to estimate bearing of a target. AESA radar requires a physically large antenna array with thousands of active antenna elements to measure bearing with high resolution by rapidly scanning a highly directional beam across a narrow, medium, or wide angular field of view. Although AESA radar has excellent detection range because of the directional natural of the radiated beam, AESA radar's ability to scan a directional beam across various fields of view comes at the expense of very complex hardware (i.e., high power consumption and cost) that limits this kind of radar mostly to military and aerospace applications. As such, AESA radar is not practical on smaller vehicle applications such as autonomous or semi-autonomous vehicles. Also, the scan time of an AESA radar increases proportionally to its field of view, because the directional beam must sweep sequentially across the entire field of view. Thus, AESA radar may not provide the time-sensitive information needed for autonomous and semi-autonomous vehicles that are in a fast changing environment.

Another type of radar technique is multi-input multi-output (MIMO) radar beamforming. A MIMO radar forms a large virtual array from a much smaller subset of physical antenna elements. A MIMO radar uses N transmitters and M receivers to synthesize an N*M array of virtual elements. These virtual elements are digitally processed (also known as digital beamforming (DBF)) to achieve high angular resolution with a smaller number (N+M) of physical elements than AESA radar. Thus, MIMO radar has a higher cost benefit than AESA radar. However, because MIMO radar captures angular information from all directions simultaneously, MIMO radar suffers from a lower signal-to-noise ratio (SNR) at each of its receivers, especially in the LRR mode where a high SNR is desired to increase the detection range.

To overcome the low SNR in the LRR mode, known MIMO radar sensors add a dedicated high gain antenna to increase the SNR during the LRR mode, while a different, dedicated low gain antenna is used in MRR and SRR modes. This approach increases the physical size of the MIMO radar sensor board, as well as the number of transmitter chains and receiver chains (and, thus, the number of transmitter and receiver antenna elements). This increase in radar board size directly translates into cost increase because automotive radar sensors often use expensive printed circuit board material to pattern antennas operating in the millimeter (mm) wave regime (e.g., 76-81 giga-hertz (GHz)). Further, having a higher number of transmitter chains and receiver chains increases the overall power consumption and cost of integrated circuits necessary for operating the transmitter and receiver chains.

Disclosed herein are example multi-mode MIMO radar sensors that can operate in multiple modes (e.g., a MRR mode and a LRR mode) using the same transmitter chains. Example MIMO radar sensors disclosed herein include a transmitter module and a receiver module. The transmitter module includes an array of transmitter antenna elements grouped in transmitter chains. Each of the transmitter antenna elements is powered by a separate power amplifier. Each of the transmitter chains is to be driven by a signal that is orthogonal to the other transmitter chains. In a first mode, such as a SRR mode or MRR mode, a first set (e.g., one) of the transmitter antenna elements of each of the transmitter chains is activated. This results in a beam having a wider field of view with a shorter detection range. In a second mode, such as a LRR mode, a second set (e.g., all) of the transmitter antenna elements of each of the transmitter chains are activated. In some examples, the second set is larger than the first set. Due to power combining, this results in a beam having a narrower field of a view with a longer detection range. The transmitter antenna elements are arranged such that the distances between the phase centers of the transmitter chains in the first mode and the second mode are the same. As a result, the virtual MIMO array geometry generated by the example MIMO radar sensor is the same in both the first mode and the second mode and can be processed using the same MIMO processing algorithm for bearing estimation, which yields the same high angular resolution in all modes.

Therefore, the example MIMO radar sensors disclosed herein utilize the same transmitter chains to generate signals for multiple modes, such as a MRR mode and a LRR mode. As a result, the example MIMO radar sensors disclosed herein are physically smaller than known MIMO radar sensors that require separate higher gain transmitter antennas. Also, because the example MIMO radar sensors disclosed herein require less antennas than known MIMO radar sensors for operating in multiple modes, the example MIMO radar sensors disclosed herein utilize less power and are less expensive to manufacture and operate than known MIMO radar sensors. Further, the example MIMO radar sensors disclosed herein have improved SNR in the LRR mode while using lower gain amplifiers, which reduces power consumption and improves accuracy of the target detection. As such, the example MIMO radar sensors are excellent for measuring target bearing with high angular resolution across various fields of view and detection ranges.

While the example multi-mode MIMO radar sensors disclosed herein are described in connection with automotive vehicles (e.g., cars, trucks, vans, buses, etc.), it is understood that the example MIMO radar sensors can be implemented in connection with other types of vehicles, such as aircraft (manned or unmanned), trains, watercraft, and/or any other moving object. Further, the example radar sensors can be utilized on stationary objects. For example, a MIMO radar sensor may be disposed on a wall in a factory to detect movement of objects around the factory.

Turning to the figures, FIG. 1 shows an example vehicle 100 with which example MIMO radar sensors disclosed herein may be implemented. An example MIMO radar sensor can be coupled to a front 102 of the vehicle 100, for example. As mentioned above, it is desired to have a radar sensor on the front 102 of the vehicle 100 that can operate in a MRR mode and a LRR mode. In the MRR mode, the MIMO radar sensor has a wider field of view and a shorter detection range. In the LRR mode, the MIMO radar sensor has a narrower field of view but a longer detection range. Example MIMO radar sensors can also be utilized on other sides of the vehicle 100. For example, a MRR/LRR radar sensor can be used on the rear of the vehicle 100. In some examples, LRR mode may not be necessary on certain sides of the vehicle 100. For example, the left and right sides of the vehicle 100 may have radar sensors that only operate in the SRR mode and the MRR mode (but not LRR mode).

Figure 2:
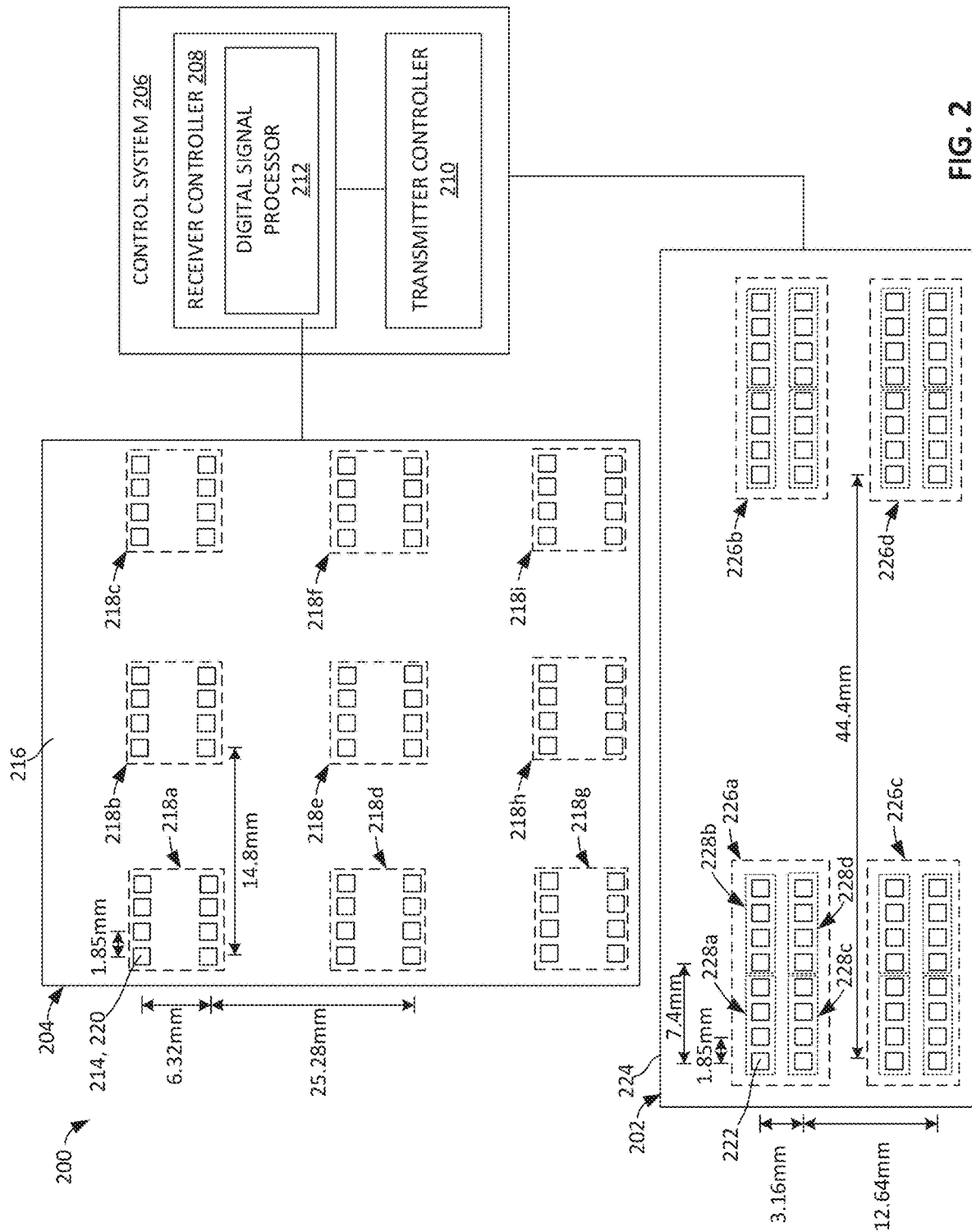
FIG. 2 illustrates an example MIMO radar sensor having an example transmitter module and an example receiver module constructed in accordance with the teachings of this disclosure.

FIG. 2 illustrates an example MIMO radar sensor 200 (referred to herein as the radar sensor 200) constructed in accordance with the teachings of this disclosure. The radar sensor 200 can be implemented on (e.g., coupled to) the front 102 of the vehicle 100 of FIG. 1, for example. The radar sensor 200 implements an array architecture that is capable of operating in multiple modes having different fields of view and detection ranges, such as a MRR mode and a LLR mode.

The example radar sensor 200 illustrated in FIG. 2 includes a transmitter module 202 and a receiver module 204 (which may also be referred to as the transmitter array and the receiver array, respectively). The transmitter module 202 and the receiver module 204 form a MIMO antenna array with adjustable field of view. In general, the transmitter module 202 includes an array of antenna elements that transmit radar signals. The signals form a beam in the azimuth and elevation. The radar signals are echoed off of targets and received by an array of antenna elements of the receiver module 204.

The receiver antenna elements and the transmitter antenna elements are spaced to produce a predetermined horizontal pitch and a predetermined vertical pitch in a virtual array. In other words, the physical array is spaced to achieve a desired target horizontal and vertical pitch in the virtual array. In the examples disclosed herein, the transmitter and receiver antenna elements are physically arranged in such a way that the horizontal pitch in the virtual array is about half a wavelength ($\lambda$) (e.g., 0.5$\lambda$±0.02) and the vertical pitch in the virtual array is about 0.8$\lambda$ (e.g., 0.8$\lambda$±0.2). These parameters may be used with any desired operating frequency. For purposes of explanation in this disclosure, it is assumed the example radar sensors disclosed herein have an operating frequency (f) of approximately 76-81 gHz. At 78.5 gHz, for example, the horizontal pitch in the virtual array is approximately 1.85 mm, which is 0.48$\lambda$ (i.e., about half a wavelength), and the vertical pitch in the virtual array is approximately 3.16 mm, which is 0.8$\lambda$. The 0.8$\lambda$ in the vertical direction enables the use of a higher gain antenna while avoiding grating lobes. Also, the scanning range or field of view in elevation is ±20°, so it can be under-sampled at 0.8$\lambda$. Thus, using this spacing, the example radar sensors disclosed herein can operate at approximately 76-81 gHz. However, it is understood that the spacing of the physical array can be changed based on the desired operating frequency of the radar sensor, i.e., the spacing's can be scaled up or down based on the desired frequency of the radar sensor. Further, in other examples, the spacing of the physical array can be changed to achieve another horizontal and/or vertical pitch in the virtual array.

The transmitter module 202 and the receiver module 204 are hardware components. In the illustrated example, the transmitter module 202 and the receiver module 204 are separate modules (e.g., constructed on separate printed circuit boards (PCBs). As such, the transmitter module 202 can be coupled to the front 102 of the vehicle 100 in one location and the receiver module 204 can be coupled to the front 102 of the vehicle 100 at another location (e.g., 1 meter apart). In other examples, the transmitter module 202 and the receiver module 204 may be constructed as a single module (e.g., constructed on a common PCB).

The example radar sensor 200 includes a control system 206 electrically coupled to (e.g., via a wired or wireless communication network) the transmitter module 202 and the receiver module 204. The control system 206 of FIG. 2 includes a receiver controller 208 for controlling the receiver module 204 and a transmitter controller 210 for controlling the transmitter module 202. The receiver controller 208 includes a digital signal processor 212 that receives and processes the signals received by the antenna elements of the receiver module 204. The control system 206 can implemented by a logic circuit such as, for example, a hardware processor. However, any other type of circuitry may additionally or alternatively be used such as, for example, one or more analog or digital circuit(s), logic circuits, programmable processor(s), application specific integrated circuits (ASIC(s)), programmable logic devices (PLD(s)), field programmable logic devices (FPLD(s)), programmable controller(s), graphic processing units (GPU(s)), digital signal processors (DSP(s)), etc. The control system 206 may be part of a separate system (e.g., the engine control system (ECS) of the vehicle 100 (FIG. 1)) and/or one or more parts of the control system 206 can be integrated into the transmitter module 202 and/or the receiver module 204.

In the illustrated example, the receiver module 204 includes an array of receiver antenna elements 214 (one of which is referenced in FIG. 2) coupled to a substrate 216. The receiver antenna elements 214 receive radar signal (e.g., echoed radar signals). The receiver antenna elements 214 are passive antennas. In some examples, the receiver antenna elements 214 are high gain antennas having a gain of 9.5 decibels-relative-to-isotropic (dBi). In other examples, the receive antenna elements 214 may have higher or lower gains. The receiver antenna elements 214 are disposed in a specific pattern or arrangement, as disclosed in further detail herein. The substrate 216 may be a PCB, silicone, plastic, rubber, and/or any other suitable material. Circuitry (e.g., resistors, capacitors, amplifiers, etc.) for operating or tuning the receiver antenna elements 214 may be formed on (e.g., printed on) and/or embedded in the substrate 216.

In the illustrated example of FIG. 2, the receiver antenna elements 214 are grouped together to form nine receiver subarrays 218a-218i (shown in dashed or broken lines). The receiver subarrays 218a-218i are arranged in a 3×3 grid (in the horizontal (X) and vertical (Y) direction). In the illustrated example, each of the receiver subarrays 218a-218i includes eight receiver chains 220 (one of which is referenced in FIG. 2). In this example, each of the receiver chains 220 is defined by one receiver antenna element 214. Therefore, in this example, each of the receiver antenna elements 214 represents one of the receiver chains 220. Therefore, the receiver module 204 has a total of 72 receiver chains 220 in this example.

In the illustrated example of FIG. 2, the receiver antenna elements 214 (and, thus, the receiver chains 220) of each of the receiver subarrays 218a-218i are arranged in a 2×4 grid (i.e., two rows of four receiver antenna elements 214). With reference to the first receiver subarray 218a, the receiver antenna elements 214 are horizontally spaced apart by the horizontal pitch in the virtual array. As disclosed above, the horizontal pitch is approximately half a wavelength (e.g., ±0.02), such as 0.48λ. As such at 78.5 gHz, for example, the receiver antenna elements 214 are horizontally spaced apart by about 1.85 mm. Further, the receiver antenna elements 214 in the top row are vertically spaced from the receiver antenna elements 214 in the bottom row by two times (2×) the vertical pitch in the virtual array. As disclosed above, the vertical pitch is approximately 0.8λ (e.g., ±0.02). As such, at 78.5 gHz, the receiver antenna elements 214 in the top row are vertically spaced from the receiver antenna elements 214 in the bottom row by about 6.32 mm. The same horizontal and vertical spacing applies for the receiver antenna elements 214 in the other receiver subarrays 218b-218i.

In regards to the horizontal spacing between the receiver subarrays 218a-218i, in one embodiment the bottom left receiver antenna element 214 in the first receiver subarray 218a is horizontally spaced from the corresponding bottom left receiver antenna element 214 in the second receiver subarray 218b by eight times (8×) the horizontal pitch, which is 14.8 mm (i.e., 1.85 mm*8=14.8 mm). The same horizontal spacing applies for the other receiver antenna elements 214 in the first receiver subarray 218a and the corresponding receiver antenna elements 214 in the second receiver subarray 218b. The same horizontal spacing also applies to the other receiver subarrays. In regards to the vertical spacing between the subarrays 218a-218i, in one embodiment, the bottom left receiver antenna element 214 in the first receiver subarray 218a is vertically spaced from the corresponding bottom left receiver antenna element 214 in the fourth receiver subarray 218d by eight times (8×) the vertical pitch (8*0.8λ=6.4λ), which is 25.28 mm (i.e., 3.16 mm*8=25.28 mm). The same vertical spacing applies for the other receiver antenna elements 214 in the first receiver subarray 218a and the corresponding receiver antenna elements 214 in the fourth receiver subarray 218d. The same vertical spacing applies for the other receiver subarrays.

Now turning to the transmitter module 202, in the illustrated example, the transmitter module 202 has an array of transmitter antenna elements 222 (one of which is referenced in FIG. 2) coupled to a substrate 224. The transmitter antenna elements 222 are active antenna elements that transmit radar signals. In some examples, the transmitter antenna elements 222 are low gain antenna elements (e.g., less than 8 dBi). For example, each of the transmitter antenna elements 222 may have a gain of 6.5 dBi. In other examples, the transmitter antenna elements 222 may have higher or lower gains. The transmitter antenna elements 222 are arranged in a specific pattern or arrangement, as disclosed in further detail herein. Similar to the substrate 216 of the receiver module 204, the substrate 224 may be silicone, a PCB, plastic, rubber, etc. Circuitry (e.g., resistors, capacitors, amplifiers, etc.) for operating or tuning the transmitter antenna elements 222 may be formed on (e.g., printed on) and/or embedded in the substrate 224.

In the illustrated example of FIG. 2, the transmitter antenna elements 222 are grouped together in four transmitter subarrays 226a-226d (shown in dashed or broken lines). The transmitter subarrays 226a-226d are arranged in a 2×2 grid. Further, groups of the transmitter antenna elements 222 form transmitter chains in each of the transmitter subarrays 226a-226d. In particular, in this example, each of the transmitter subarrays 226a-226d has four transmitter chains 228a-228d (only labeled in the first transmitter subarray 226a). The transmitter chains 228a-228d are outlined in dotted lines in FIG. 2. In the illustrated example, each of the transmitter chains 228a-228d has four transmitter antenna elements 222. In this example, the transmitter module 202 has 16 transmitter chains. Therefore, the radar sensor 200 of FIG. 2 includes 16 transmitter chains (each with 4 transmitter antenna elements 222) and 72 receiver chains (each with one receiver antenna element 214). As a result, the example radar sensor 200 can generate 1152 virtual MIMO channels (16 transmitter chains*72 receiver chains=1152).

In the illustrated example, the transmitter chains 228a-228d of each of the transmitter subarrays 226a-226d are arranged in a 2×2 grid. As shown in the first transmitter subarray 226a, the transmitter chains 228a-228d are formed by rows of 4 transmitter antenna elements 222. In this example, the transmitter antenna elements 222 in the top row (the first and second transmitter chains 228a, 228b) are vertically aligned directly above the transmitter antenna elements 222 in the bottom row (the third and fourth transmitter chains 228c, 228d). The transmitter antenna elements 222 in each row are horizontally spaced apart by the horizontal pitch, which is about half a wavelength (0.5λ). Thus, at 78.5 gHz, for example, the transmitter elements 222 are horizontally spaced apart by 1.85 mm. Further, the transmitter antenna elements 222 in the top row are vertically separated from the transmitter antenna elements 222 in the bottom row by the vertical pitch, which is about 0.8λ. Thus, at 78.5 gHz, for example, the transmitter antenna elements 222 in the top row are vertically spaced from the transmitter antenna elements 222 in the bottom row by 3.16 mm. The same spacing applies for the transmitter antenna elements 222 in the other transmitter subarrays 226b-226d.

In regards to the horizontal spacing between the transmitter subarrays 226a-226d, the bottom left transmitter antenna element 222 in the first transmitter subarray 226a is horizontally spaced from the corresponding bottom left transmitter antenna element 222 in the second transmitter subarray 226a by twenty-four times (24×) the horizontal pitch, which is 44.4 mm (i.e., 1.85 mm*24=44.4 mm). The same distance applies for the other transmitter antenna elements 222 in the first transmitter subarray 226a and the corresponding transmitter antenna elements 222 in the second transmitter subarray 226b. This same horizontal spacing applies for the transmitter antenna elements 222 in the third and fourth transmitter subarrays 226c, 226d.

In regards to the vertical spacing, the bottom left transmitter antenna element 222 in the first receiver subarray 226a is vertically spaced from the corresponding bottom left transmitter antenna element 222 in the third transmitter subarray 226c by about 4 times (4×) the vertical pitch (4*0.8λ=3.2λ), which is 12.64 mm (i.e., 3.16 mm*4=12.64 mm). The same vertical spacing applies for the other transmitter antenna elements 222 in the first transmitter subarray 226a and the corresponding transmitter antenna elements 222 in the third transmitter subarray 226b. This same vertical spacing applies for the transmitter antenna elements 222 in the second and fourth transmitter subarrays 226b, 226d.

The example arrangement and spacings shown in FIG. 2 enable the transmitter module 202 to operate in a MRR mode and a LRR mode while creating the same virtual MIMO geometry array, as disclosed in further detail herein. In this example, the azimuth and elevation pitches between the receiver antenna elements 214 and the transmitter antenna elements 222 are such that the virtual array can digitally form a beam up to approximately ±75° field of view in azimuth and approximately ±20° field of view in elevation without grating lobes. In this example, the yielded angular resolution is approximately 2° in both azimuth and elevation.

In other examples, the receiver module 204 may include more or fewer receiver subarrays and/or the receiver subarrays may be spaced differently, the receiver subarrays may include more or fewer receiver antenna elements and receiver chains and the receiver antennas elements may be arranged in different patterns and/or spaced differently, the transmitter module 202 may include more or fewer transmitter subarrays and/or the transmitter subarrays may be spaced differently, and/or the transmitter subarrays may include more or fewer transmitter antenna elements and transmitter chains and the transmitter antennas elements may be arranged in different patterns and/or spaced differently. Thus, other arrangements or patterns may be implemented. The example array can be scaled up or down as desired (e.g., for higher or lower resolution).

Figure 3:
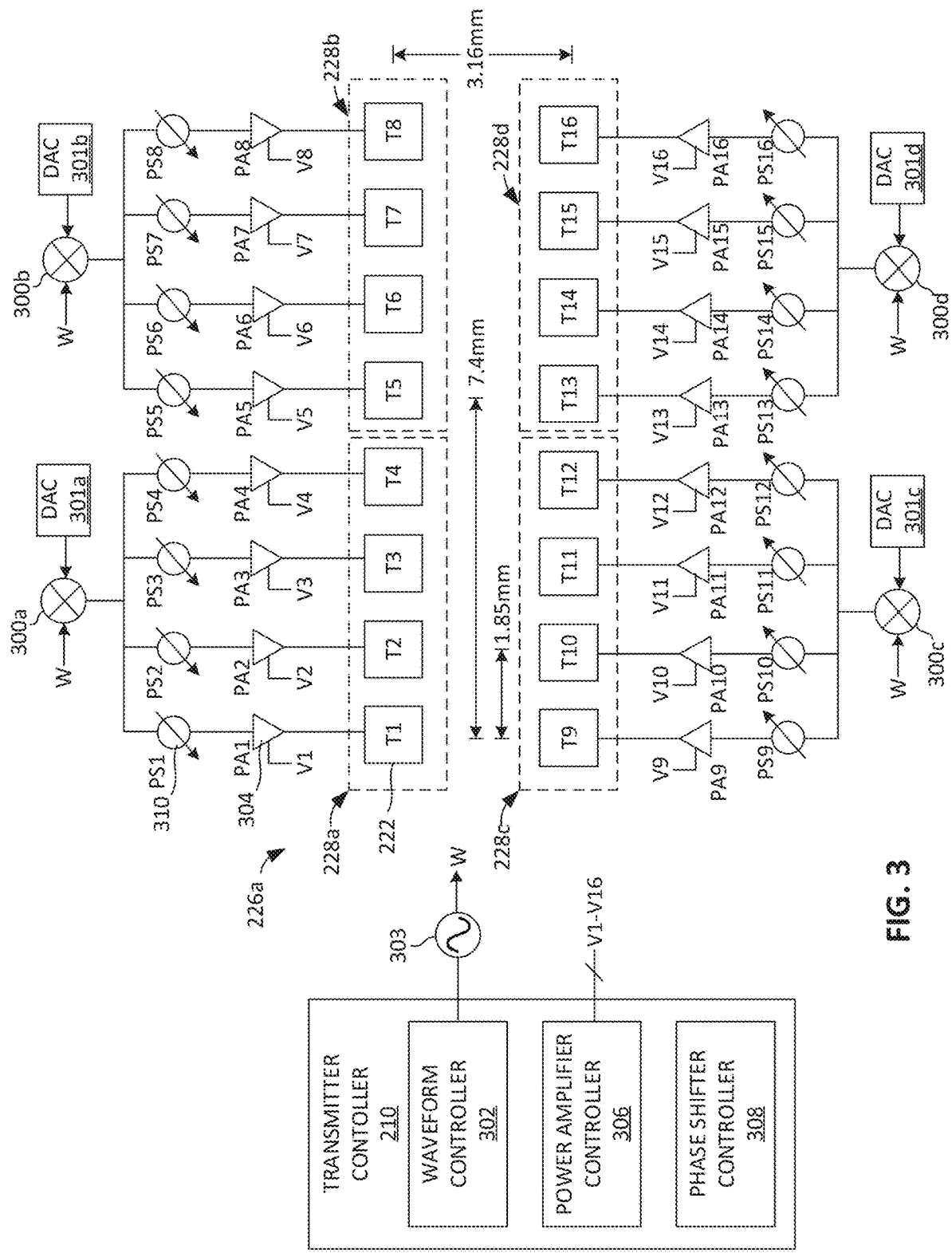
FIG. 3 is a schematic of an example transmitter subarray of the example transmitter module of FIG. 2.

FIG. 3 is a schematic of the first transmitter subarray 226a of the transmitter module 202. The second, third, and fourth transmitter subarrays 226b-226d are structured the same and configured to operate the same as the first transmitter subarray 226a. Thus, any of the aspects disclosed below in connection with the first transmitter subarray 226a can likewise apply to the second, third, and fourth transmitter subarrays 226b-226d.

The first transmitter subarray 226a of FIG. 3 has four transmitter chains 228a-228d, each with four transmitter antenna elements 222 (one of which is referenced in FIG. 3). Thus, the first transmitter subarray 226a has 16 transmitter antenna elements 222. The transmitter antenna elements 222 have been numbered T1-T16 in FIG. 3. Antenna elements T1-T4 form the first transmitter chain 228a, antenna elements T5-T8 form the second transmitter chain 228b, antenna elements T9-12 form the third transmitter chain 228c, and antenna elements T13-T16 form the fourth transmitter chain 228d.

In the illustrated example, the transmitter antenna elements T1-T16 are arranged in two rows of eight antenna elements. The first and second transmitter chains 228a, 228b are arranged in a first horizontal row (the top row) and the third and fourth transmitter chains 228c, 228d are arranged in a second horizontal (the bottom row). Each of the transmitter antenna elements T1-T16 is horizontally spaced from an adjacent transmitter antenna element by the horizontal pitch, which is about 0.5λ, which is 1.85 mm. Each antenna element T1-T16 is vertically spaced from an adjacent antenna element by the vertical pitch, which is about 0.8λ, which is 3.16 mm. In other words, the top row of transceiver antenna elements T1-T8 is spaced from the bottom row of transceiver antenna elements T9-T16 by 3.16 mm.

The transmitter antenna elements of each of the transmitter chains 228a-228d are driven by a common signal (sometime referred to as a waveform). Each of the transmitter chains 228a-228d is to be driven by a signal that is orthogonal to the other transmitter chains 228a-228d. To achieve this orthogonality, the example radar senor 200 of FIG. 3 includes respective mixers 300a-300d and digital-to-analog converters (DACs) 301a-301d associated with each of the transmitter chains 228a-228d. The example radar sensor 200 further includes a local oscillator 303. The local oscillator 303 outputs a local signal or waveform W. The local signal W is received by each of the mixers 300a-300d and mixed with the respective signals from the DACs 301a-301d, which produces orthogonal radio frequency (RF) signals for each of the transmitter chains 228a-228d. Therefore, each of the transmitter chains 228a-228d is driven by a signal that is orthogonal to the other transmitter chains 228a-228d. This arrangement enables the four orthogonal signals to be synchronized. In other examples, instead of using the local oscillator 303, four separate oscillators may be used to produce the four signals for the respective transmitter chains 228a-228d. In the illustrated example, the transmitter controller 210 includes a waveform controller 302 that controls and/or selects the signal/waveform to be output by the local oscillator 303. In some examples, the waveform controller 302 also controllers the mixers 300a-300d and/or the DACs 301a-301d to produce the desired orthogonal signals.

Additionally or alternatively, orthogonality can be achieved in different dimensions using different techniques. For example, orthogonality can be achieved in the time domain, such as by activating only one of the transmitter chains 228a-228d at a time. As another example, orthogonality can be achieved by transmitting from all the transmitter chains 228a-228d at the same time but at different frequencies that do not overlap. As another example, orthogonality can be achieved by encoding the signals with a phase sequence that is orthogonal between the different transmitter chains 228a-228.

In the illustrated example of FIG. 2, the first transmitter subarray 226a includes a plurality of power amplifier 304 (one of which is referenced in FIG. 3) associated with (e.g., in circuit with) respective ones the transmitter antenna elements T1-T16. The power amplifiers 304 have been number PA1-PA16. The transmitter antenna elements T1-T16 are activated and deactivated by activating and deactivating the corresponding power amplifier PA1-PA16. For example, when the first power amplifier PA1 is activated, the first power amplifier PA1 amplifies the signal from the first signal generator 300a and provides the amplified signal to the first transmitter antenna element T1. In the illustrated example, each of the power amplifiers PA1-PA16 is controlled by a voltage signal (sometimes referred to as a biasing current or voltage), labeled V1-V16. The power amplifiers PA1-PA16 may be turned on or off by applying or ceasing the voltage signal V1-V16. In some examples, each of the power amplifiers PA1-PA16 have an output power of 10 decibel-milliwatts (dBm). In other examples, the power amplifiers PA1-PA16 may have a higher or lower output power.

In the illustrated example, the transmitter controller 210 includes a power amplifier controller 306 for turning on and off the individual power amplifiers PA1-PA16 and, thus, activating or deactivating the corresponding transmitter antenna elements T1-T16. In some examples, the power amplifier controller 306 controls the ON/OFF control of the power amplifiers PA1-P16 by controlling the voltage V1-V16 to the power amplifiers PA1-PA16. The transmitter controller 210 also includes a phase shifter controller 308, discussed in further detail herein.

The first transmitter subarray 226a is capable of operating in at least a MRR mode and a LRR mode. In the MRR mode, the resulting beam has a larger (wider) azimuth with a shorter detection range, whereas in the LRR mode, the resulting beam has a smaller (narrower) azimuth with a longer detection range. In some examples, the transmitter controller 210 operates the first transmitter subarray 226a to switch or alternate (e.g., at a predetermined frequency) between operating in the MRR mode and the LRR mode.

In the MRR mode, a first set or number of the transmitter antenna elements of each of the transmitter chains 228a-228d is activated. The activated transmitter antenna element(s) is/are in the same corresponding position (e.g., the left transmitter antenna element) in each of the transmitter chains 228a-228d is activated. In some examples, the first set of transmitter antenna elements to be activated in the MMR mode is one. For example, in the MRR mode, the first transmitter antenna element T1 is activated and emits a signal from the first signal generator 300a, the fifth transmitter antenna element T5 is activated and emits a signal from the second signal generator 300b, the ninth transmitter antenna element T9 is activated and emits a signal from the third signal generator 300c, and the thirteenth transmitter antenna element T13 is activated and emits a signal from the fourth signal generator 300d. The power amplifier controller 306 activates the first, fifth, ninth, and thirteenth transmitter antenna elements T1, T5, T9, and T13 by applying a voltage V1, V5, V9, V13 to the respective power amplifiers V1, V5, V9, V13. In this example, the other antenna elements T2-T4, T6-T8, T10-T12, T14-T16 are not activated (i.e., no voltage or biasing current is applied to the respective power amplifiers). As a result, in the MRR mode, a phase center (sometimes referred to as center-of-gravity) of the first transmitter chain 228a is at the center of the first transmitter antenna element T1, a phase center of the second transmitter chain 228b is at the center of the fifth transmitter antenna element T5, a phase center of the third transmitter chain 228c is at the center of the ninth transmitter antenna element T9, and a phase center of the fourth transmitter chain 228d is at the center of the thirteenth transmitter antenna element T13. The phase center of the first transmitter chain 228a is horizontally spaced from the phase center of the second transmitter chain 228 by four times (4×) the horizontal pitch, which is about 2λ (4*0.5λ=2λ), which is 7.4 mm (i.e., 3.7 mm*2=7.4 mm). The phase center of the third and fourth transmitter chains 228c, 228d are similarly horizontally spaced apart. The vertical distance between the phase centers of the first and third transmitter chains 228a, 228c is the vertical pitch, which is about 0.8λ, which is 3.16 mm. The phase centers of the second and fourth transmitter chains 228b, 228d are similarly vertically spaced apart.

In the LRR mode, a second set or number of the transmitter antenna elements of each of the transmitter chains 228a-228d are activated. In some examples, the second set of the transmitter antenna elements is larger or greater than the first set of the transmitter antenna elements activated during the MRR. For example, the second set of transmitter antenna elements to be activated in the LLR mode is all of the available transmitter antenna elements of each of the transmitter chains 228a-228d. For example, in the LRR mode, transmitter antenna elements T1-T4 are activated and emit the same signal from the first signal generator 300a, transmitter antenna elements T5-T8 are activated and emit the same signal from the second signal generator 300b, transmitter antenna elements T9-T12 are activated and emit the same signal from the third signal generator 300c, and transmitter antenna elements T14-T16 are activated and emit the same signal from the fourth signal generator 300d. The power amplifier controller 306 activates all of the transmitter antenna elements T1-T16 by applying a voltage V-V16 to the respective power amplifiers PA1-PA16. In the LRR mode, a phase center of the first transmitter chain 228a is midway between the second and third transmitter antenna elements T2, T3, a phase center of the second transmitter chain 228b is midway between the sixth and seventh transmitter antenna elements T6, T7, a phase center of the third transmitter chain 228c is midway between the tenth and eleventh transmitter antenna elements T10, T11, and a phase center of the fourth transmitter chain 228d is midway between the fourteenth and fifteenth transmitter antenna elements T14, T15. As a result, the relative distances between the phase centers of the transmitter chains 228a-228d in the LRR mode is the same as in the MRR mode. In particular, the horizontal distance between the phase centers of the first and second transmitter chains 228a, 228b is 4× the horizontal pitch, which is 7.4 mm (same for the third and fourth transmitter chains 228c, 228d), and the vertical distance between the phase centers of the first and third transmitter chains 228a, 228c is the vertical pitch, which is 3.16 mm (same for the second and fourth transmitter chains 228b, 228d), in both the MRR mode and the LRR mode.

Assume, for example, that each of the antenna elements T1-T16 is a low gain antenna with a gain of 6.5 dBi. In the MRR mode, only the first power amplifier PA1 of the first transmitter chain 228a is turned on and activates the first antenna element T1. The total gain antenna element gain and the spatial combining gain can be determined used Equation 1 below.

$$\text{Antenna Gain} + 10*\log 10(\text{\# of Power Amplifiers}) + 10*\log(\text{\# of Antenna Elements}) = \text{Total Gain} \qquad \text{Equation 1}$$

Therefore, the total gain for the first transmitter chain 228a in the MRR mode is 6.5 db (6.5 dBi+10*log 10(1)+10*log 10(1)=6.5 db). The other transmitter chains 228b-228d similarly have a gain of 6.5 db in the MRR. This is sufficient to produce a beam having a relatively wide azimuth with mid-range detection.

In the LRR, all of the transmitter antenna elements T1-T4 of the first transmitter chain 228a are activated. The power amplifiers PA1-PA4 are turned on to activate the transmitter antenna elements T1-T4. Therefore, the total gain for the first transmitter chain 228a in the LRR mode is 18.5 db (6.5+10*log 10(4)+10*log 10(4)=18.5 db). As such, a much higher gain is produced by the same transmitter chain using the spatial power combining. The other transmitter chains 228b-228d similarly have a total gain of 18.5 decibels (dB) in the LRR mode. The resulting beam has narrower width but a longer detection range (e.g., the detection range is twice as long as in the MRR mode).

Further, in the LRR mode, the SNR ratio is increased by 12 db (20*log 10(number of transmitter antenna elements (4))=12 dB). 6 dB comes from the coherent combining of the four power amplifiers and 6 dB comes from the directivity increase of the four transmitter antenna elements. Each 12 dB increase in SNR corresponds to a 2× factor increase in radar detection range. In the LRR mode, spatial power combining occurs because all of the transmitter antenna elements of a chain are activated (e.g., transmitter antenna elements T1-T4 are activated in the LRR mode). As such, the effective isotropic rated power (ERIP) is increased by 20 log(4)=12 db compared to the MRR mode. This spatial power combining enables the use of lower gain amplifiers (e.g., 10 dbm) in a chain while still achieving higher EIRP. Lower gain amplifiers consume less power than higher gain amplifiers. Thus, the example radar sensor 200 utilizes less power to achieve excellent SNR compared to known radar sensors that utilize high gain amplifiers with higher power consumption.

Table 2 below shows the ON/OFF configuration for the power amplifiers PA1-PA16 and the transmitter antenna elements T1-T16 in the MRR mode and the LRR mode.

TABLE 2

| TX Chain | PA Path | TX Antenna Element | MRR PA State | LRR PA State |
|---|---|---|---|---|
| TX#1 | PA1 | T1 | On | On |
|  | PA2 | T2 | Off | On |
|  | PA3 | T3 | Off | On |
|  | PA4 | T4 | Off | On |
| TX#2 | PA5 | T5 | On | On |
|  | PA6 | T6 | Off | On |
|  | PA7 | T7 | Off | On |
|  | PA8 | T8 | Off | On |
| TX#3 | PA9 | T9 | On | On |
|  | PA10 | T10 | Off | On |
|  | PA11 | T11 | Off | On |
|  | PA12 | T12 | Off | On |
| TX#4 | PA13 | T13 | On | On |
|  | PA14 | T14 | Off | On |
|  | PA15 | T15 | Off | On |
|  | PA16 | T16 | Off | On |

As shown in Table 2, during MRR mode, only the power amplifiers PA1, PA5, PA9, and PA13 for transmitter antenna elements T1, T5, T9, and T13 are activated, and the other power amplifiers are off. During LRR, all of the power amplifiers PA1-PA16 are activated.

In some examples, the transmitter controller 210 of the control system 206 controls the transmitter module 202 to switch or alternate between activating the transmitter antenna elements 222 (and, thus, the transmitter chains 228a-228d) in the MRR mode and the LRR mode at a particular frequency. In some examples, between each switch between the MRR mode and the LRR mode, the transmitter module 202 is deactivated to allow the receiver module 204 time to receive and process the signals. For example, the transmitter controller 210 may activate the transmitter module 202 for a first period of time (e.g., 20 ms from T=0 to T=20 ms) according to the MRR mode (i.e., where one antenna element from each transmitter chain is activated). Then, for a second period of time (e.g., 20 ms from T=20 ms to T=40 ms), the transmitter controller 210 may deactivate the transmitter module 202. During the second period of time, the receiver module 204 receives (listens for) the echoed radar signals and the digital signal processor 212 (FIG. 2) processes the signals. Then, transmitter controller 210 activates the transmitter module 202 for a third period of time (e.g., 20 ms from T=40 ms to T=60 ms) according to the LRR mode (i.e., where all of the antenna elements of each transmitter chains are activated). Then, during a fourth period of time (e.g., 20 ms from T=60 ms to T=80 ms), the receiver module 204 receives (listens for) the echoed signals, and the digital signal processor 212 processes the signals. This cycle may be repeated numerous times at a high rate. In some examples, this cycle is repeated as long as object detection is desired (e.g., while the vehicle 100 is running and in motion). In some examples, the time periods of activation for the MRR mode, the LRR mode, and the listening are all the same. In other examples, the time periods may be different.

Referring back to FIG. 3, in some examples, the first transmitter subarray 226a includes a plurality of phase shifters 310 (one of which is referenced in FIG. 3) associated with (e.g., in circuit with) respective ones of the receiver antenna elements T1-T16. The phase shifters 310 may be analog or digital phase shifters. The phase shifters 310 have been labeled PS1-PS16 in FIG. 3. The phase shifters PS1-PS16 are controlled by the phase shifter controller 308. The phase shifters PS1-PS16 may be used to shift the phase of the signals provided to the respective transmitter antenna elements T1-T16 to produce a steerable field of view. The steerable field of view enables large angular tilts (e.g., ±5°) even though the radar sensor 200 may be fixed in one location on the vehicle 100. This may be advantageous to steer the beam in a certain directions, such as when making a turn with the vehicle 100. In other examples, the phase shifters PS1-PS16 may not be included.

Figure 4A:
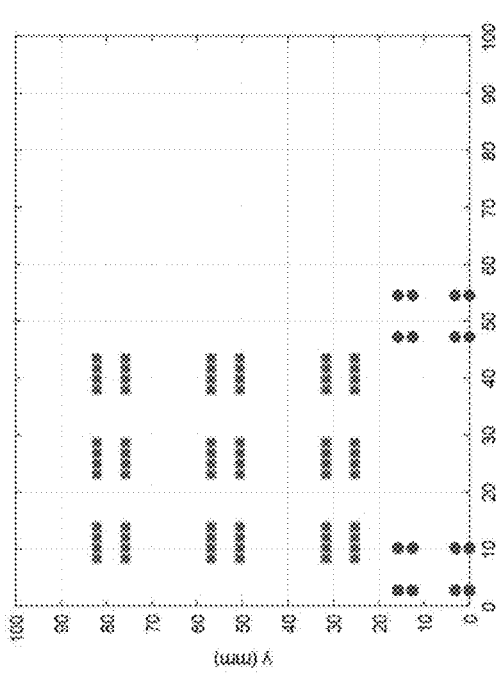
FIGS. 4A and 4B are graphs showing phase centers of transmitter and receiver chains of the example MIMO radar sensor of FIG. 2 in a mid-range radar mode and a long range radar mode, respectively.
Figure 4B:
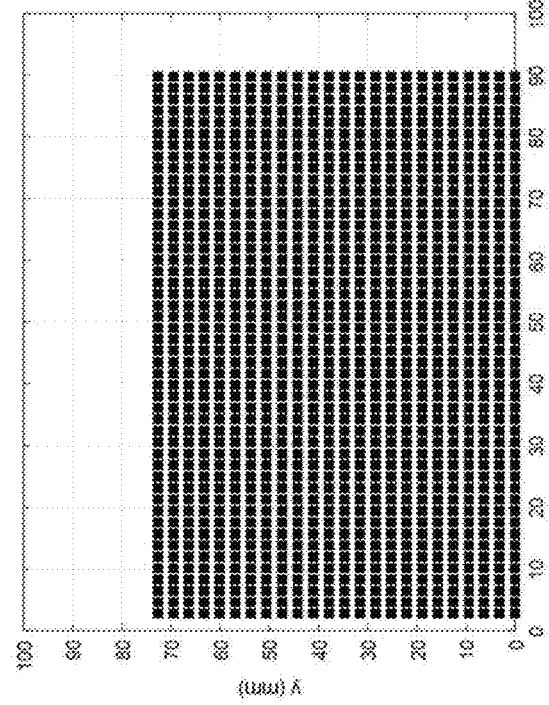

FIG. 4A is graph showing the relative phase center locations for the transmitter chains 228 and the receiver chains 220 of the radar sensor 200 during the MRR mode, and FIG. 4B is a graph showing the relative phase center locations for the transmitter chains 228 and the receiver chains 220 of the radar sensor 200 during the LRR mode. In the example graphs of FIGS. 4A and 4B, X=0 and Y=0 is the center of the bottom left transmitter antenna element of the third transmitter subarray 226c (FIG. 2). The circles represent the phase centers for the transmitter chains 228 and the squares represent the phase centers for the receiver chains 220. While the receiver chains 220 are shown as being vertically above the transmitter chains, as disclosed above, the receiver module 204 may be disposed in another location relative to the transmitter module 202.

In the MRR mode, only one transmitter antenna element from each of the transmitter chains 228 is activated, such as the far left transmitter antenna element. Thus, as seen in FIG. 4A, the phase centers are located at the center of each of the activated transmitter antenna elements. In the LRR mode, all of the transmitter antenna elements of each of the transmitter chains 228 are activated. The phase center of each of the transmitter chains 228 is located at a center of the respective chain. For example, referring back to FIG. 3, the phase center for the first transmitter chain 228a is located between the second and third transmitter antenna elements T2 and T3. As can be seen between FIG. 4A and FIG. 4B, the phase centers of the transmitter chains 228 (the circles) have shifted to the right. However, the relative distances between all of the phase centers remains the same in the MRR mode and the LRR mode.

Figure 5A:
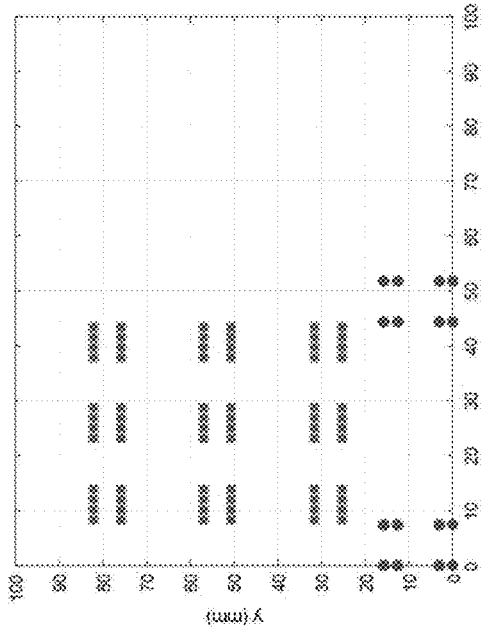
FIGS. 5A and 5B are graphs showing a virtual MIMO array geometry generated by the example MIMO radar sensor of FIG. 2 in a mid-range radar mode and a long range radar mode, respectively.
Figure 5B:
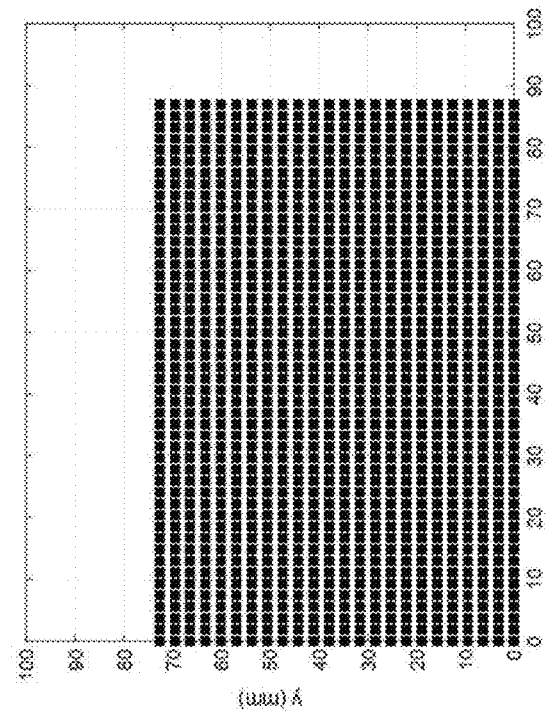

FIG. 5A is a graph showing the resulting virtual MIMO array geometry produced by the radar sensor 200 in the MRR mode, and FIG. 5B is a graph showing the resulting virtual MIMO array geometry produced by the radar sensor 200 the LLR mode. In some examples, the DSP 212 (FIG. 2) generates the virtual MIMO array geometry by arranging the two-way radar signals (echoes) in a four dimensional radar cube (range, Doppler, azimuth, elevation), processing the range-Doppler Fast Fourier Transform (FFT) on each of the two-way radar signals (echoes) and then forming the virtual array based on the physical geometry of the array. As can be seen from FIGS. 5A and 5B, the virtual MIMO array geometry is the same (i.e., contains the same number of virtual elements at the same spacing), except the virtual MIMO array geometry has shifted slightly to the right in FIG. 5B due to the shift in phase centers of the transmitter chains from the MRR mode to the LRR mode. Each element in the virtual MIMO array geometry represents a magnitude and a phase of the two-way signal that propagates from the transmitter chains 228 to the target, and from the target to the receiver chains 220. As can be seen from FIGS. 5A and 5B, the radar sensor 200 produces a virtual MIMO array geometry with relatively close elements that results in excellent resolution.

FIG. 6A is a graph showing the element 3D pattern of the field of view produced by the transmitter module 202 in the MRR mode, and FIG. 6B is a graph showing the element 3D pattern of the field of view produced by the transmitter module 202 in the LRR mode. As shown in FIG. 6A, the field of view is relatively wide. In FIG. 6B, the field of view is narrower. The elevation remains substantially the same between the MRR mode (FIG. 6A) and the LRR mode (FIG. 6B). Thus, the field of view changes between the MRR mode and the LRR mode.

FIG. 7A is a graph showing a 3D beam pattern generated by the radar sensor 200 in the MRR mode with a digital beamforming at −75° azimuth and +20° elevation. FIG. 7B is a corresponding graph of the two-dimensional (2D) beam pattern cuts for azimuth and elevation.

Figure 8A:
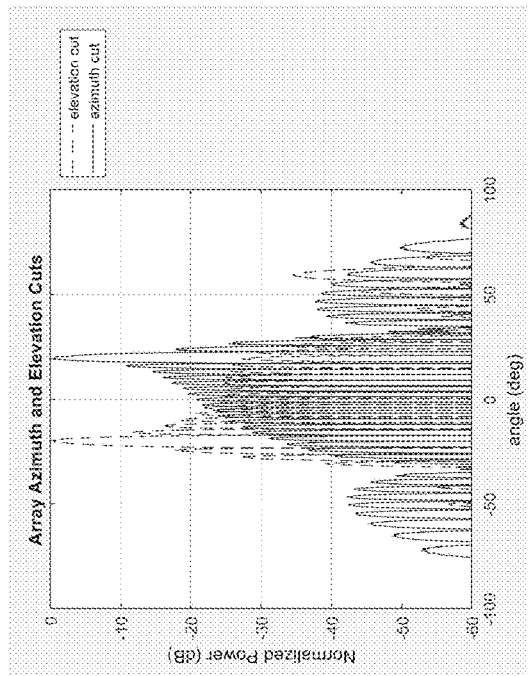
FIG. 8A is a graph showing an array 3D pattern generated by the example MIMO radar sensor of FIG. 2 in a long range radar mode with a digital beamforming at +20° azimuth and −20° elevation.
Figure 8B:
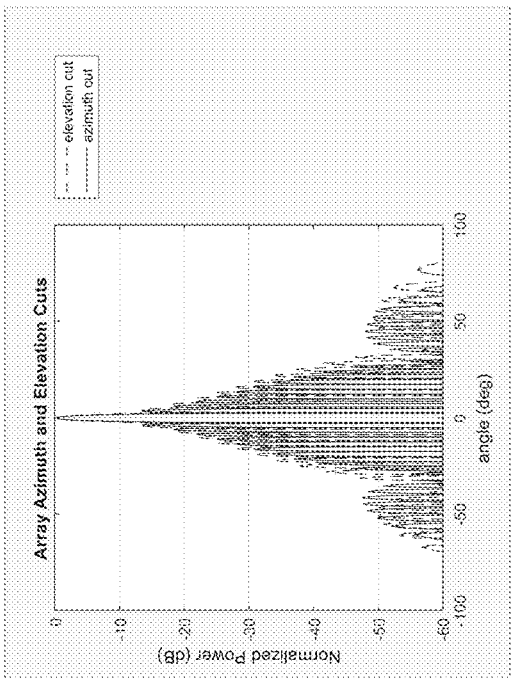
FIG. 8B is a graph showing the array azimuth and elevation cuts corresponding to the array 3D pattern of FIG. 8A.

FIG. 8A is a graph showing a 3D beam pattern generated by the radar sensor 200 in the LRR mode with a digital beamforming at +20° azimuth and −20° elevation. FIG. 8B is a corresponding graph of the 2D beam pattern cuts for azimuth and elevation.

Figure 9A:
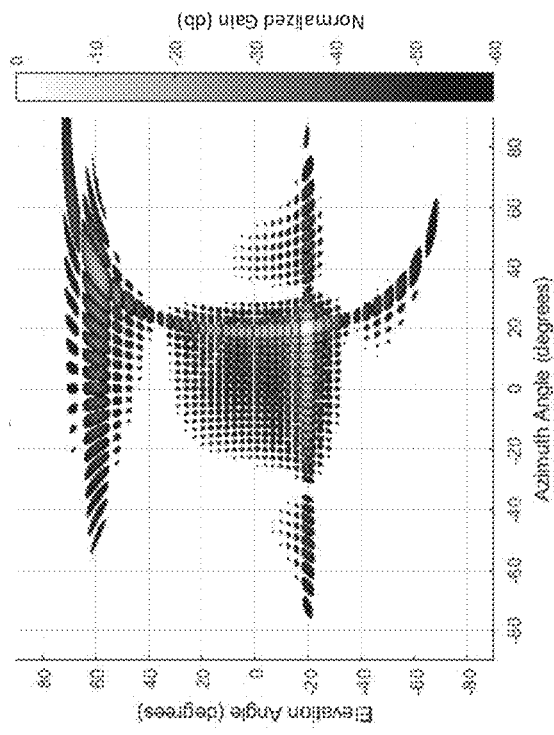
FIG. 9A is a graph showing an array 3D pattern generated by the MIMO radar sensor of FIG. 2 in a long range radar mode with digital beamforming at 0° azimuth and 0° elevation.
Figure 9B:
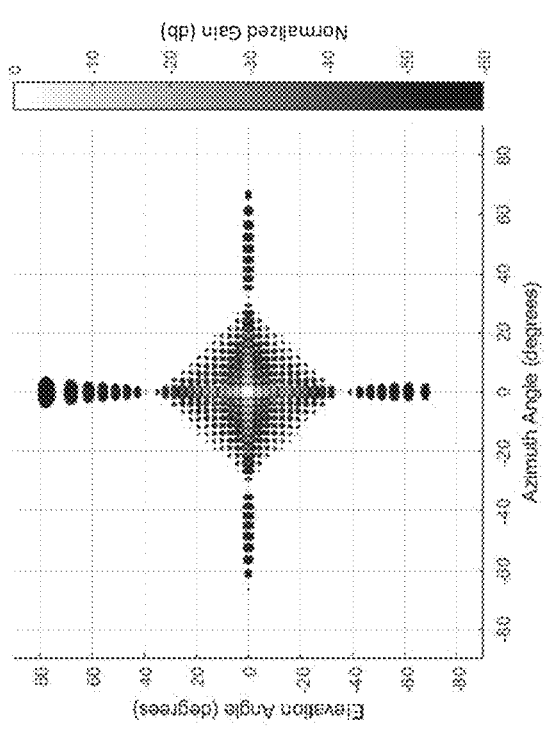
FIG. 9B is a graph showing the array azimuth and elevation cuts corresponding to the array 3D pattern of FIG. 9A.

FIG. 9A is a graph showing a 3D beam pattern generated by the radar sensor 200 in the LRR mode with a digital beamforming at 0° azimuth and 0° elevation. FIG. 9B is a corresponding graph of the 2D beam pattern cuts for azimuth and elevation. FIGS. 7A-7B, 8A-8B, and 9A-9B demonstrate the 2° high resolution performance without grating lobes in the field of view achieved by the example radar sensor 200.

While in the example above the first set of transmitter antenna elements activated in the MRR mode is one and the second set of transmitter antenna elements activated in the LRR mode includes all of the transmitter antenna elements, in other examples, other numbers of transmitter antenna elements may be activated in the MRR mode and the LRR mode. For example, in the MRR mode, two of the transmitter antenna elements of each of the transmitter chains 228a-228d may be activated, such as transmitter antenna elements T1 and T2 of the first transmitter chain 228a, transmitter antenna elements T5 and T6 of the second transmitter chains 228b, transmitter antenna elements T9 and T10 of the third transmitter chain 228c, and transmitter antenna elements T13 and T14 of the fourth transmitter chain 228d. In other examples, other ones of the transmitter antenna elements of each of the transmitter chains 228a-228d may be activated. While the distances between the phase centers may be changed compared to the other examples, the relative distances between the phase centers in the MRR mode and the LRR mode is the same. Additionally or alternatively, in the LRR, less than all of the transmitter antenna elements may be activated. For example, in the LRR, only three of each of the transmitter antenna elements of each of the transmitter chains 228a-228d is activated.

In some examples, such as the example shown in Table 2 above, the first set of transmitter antenna elements and the second set of transmitter antenna elements overlaps. In other examples, the first set and second set of transmitter antenna elements may not overlap. For example, with reference to the first transmitter chain 228a, in the MRR mode, transmitter antenna element T1 may be activated, and in the LRR mode, transmitter antenna elements T2, T3 and T4 may be activated. In still other examples, the first set and second set of transmitter antenna elements may partially overlap. For example, with reference to the first transmitter chain 228a, in the MRR mode, transmitter antenna elements T1 and T2 may be activated, and in the LRR mode, transmitter antenna elements T2, T3 and T4 may be activated.

In other examples, the same number of transmitter antenna elements may be activated in both the MRR mode and the LRR mode. For example, with reference to the first transmitter chain 228a, in the LRR mode, all of the transmitter antenna elements T1-T4 may be activated. In the MRR mode, all of the transmitter antenna elements T1-T4 may also be activated. However, in the MRR mode, the phase shifters PS1-PS4 shift the phase between the signals produced by each of the transmitter antenna elements T1-T4 to produce the wider beam. In the LRR mode, the phase shift is 0. Thus, the example transmitter module 202 can operate in different modes even while the same transmitter antenna elements of each of the transmitter chains 228a-228d are activated.

Further, while in the illustrated example each of the transmitter chains 228a-228d is formed by a plurality of transmitter antenna elements 222 in a linear array, in other examples, one or more of the transmitter chains may be formed of transmitter antenna elements in a planar array (e.g., a 2×2 grid, a 3×2 grid, etc.). Such a planar arrangement can provide another degree of freedom to adjust the vertical field of view (elevation) in addition to the horizontal field of view (azimuth).

While in the illustrated example each of the transmitter chains 228a-228d includes four transmitter antenna elements 222, in other examples, one or more of the transmitter chains 228a-228d can include more (e.g., 5, 6, etc.) or fewer (e.g., 3 or 2) transmitter antenna elements 222. The number of corresponding receiver chains may also be changed. The numbers of transmitter chains and receiver chains can be changed to achieve specific SNR and FOV values in the LRR mode.

Figures 10A, 10B, 10C:
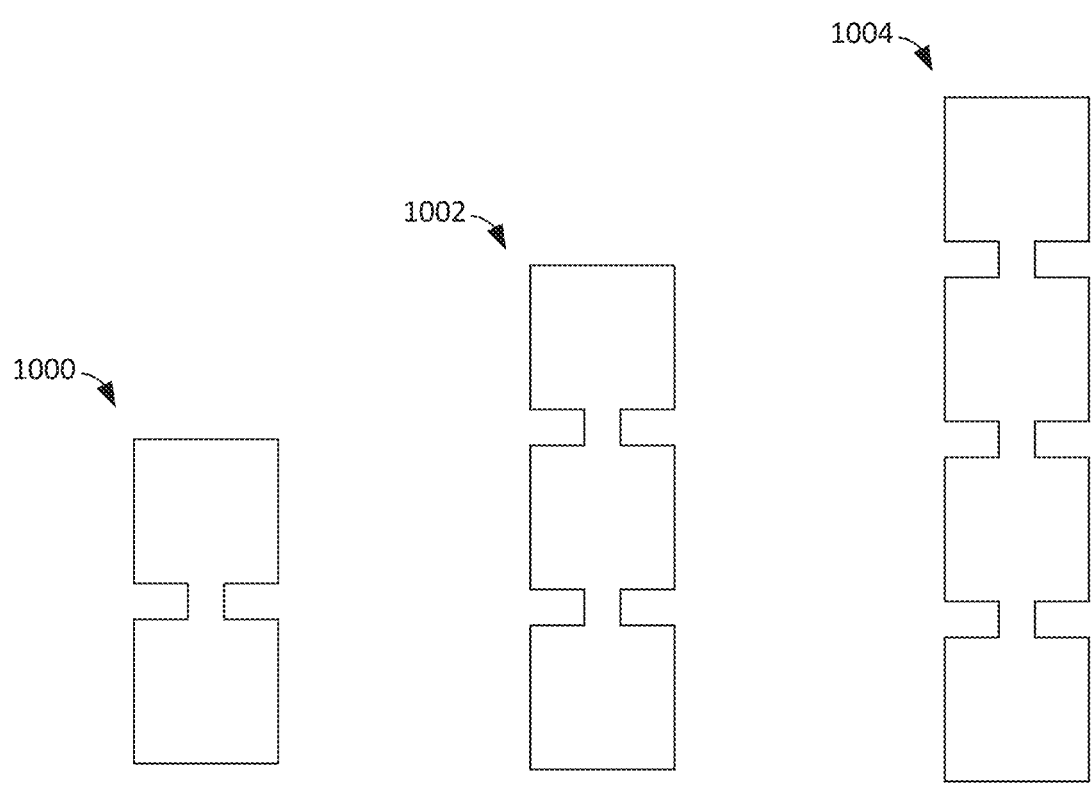
FIGS. 10A-10C illustrate example antennas that may be implemented as antenna elements in the example MIMO radar sensor of FIG. 2 and/or the example MIMO radar sensor of FIG. 11.

While in FIGS. 2 and 3 each of the receiver antenna elements 214 and the transmitter antenna elements 222 is shown as a single square antenna element, in other examples, the antenna elements may be larger or smaller in the vertical dimension, which creates a higher antenna gain. For example, FIG. 10A shows an example antenna element 1000. In some examples, one or more of the transmitter antenna elements 222 and/or the receiver antenna elements 214 are implemented as the antenna element 1000. As long as the phase centers of the antenna elements are positioned in the same relative locations, the radar sensor 200 operates the same. The antenna element 1000 may be a low gain antenna having 6.5 dBi gain, for example.

FIG. 10B shows an example antenna element 1002 that is larger in the vertical direction and has a higher gain (compared to the antenna elements 1000). In some examples, one or more the receiver antenna elements 214 are implemented as the antenna element 1002. The antenna element 1002 may be a high gain antenna having 9.5 dBi gain, for example.

FIG. 10C shows an example antenna element 1004 that is larger in the vertical direction and has a higher gain (compared to the antenna elements 1000, 1002). In some examples, one or more the receiver antenna elements 214 are implemented as the antenna element 1004. The example antenna element 1004 may be a high gain antenna having 12.5 dBi gain.

Referring back to FIG. 3, the top row of transmitter antenna elements T1-T8 is spaced from the bottom row of transmitter antenna elements T9-T16 by the vertical pitch, which is about 0.8λ, which is 3.16 mm. This is the minimum distance required to prevent physical overlapping of the 6.5 dBi gain antennas. As such, a physically larger antenna element with a higher gain cannot be used because it would require increasing the vertical pitch, thereby reducing the elevation field of view due to grating lobe onset. However, in some instances, it may be desirable to use physically larger antennas (vertically larger) with higher gains to increase SNR, thus detection range.

Figure 11:
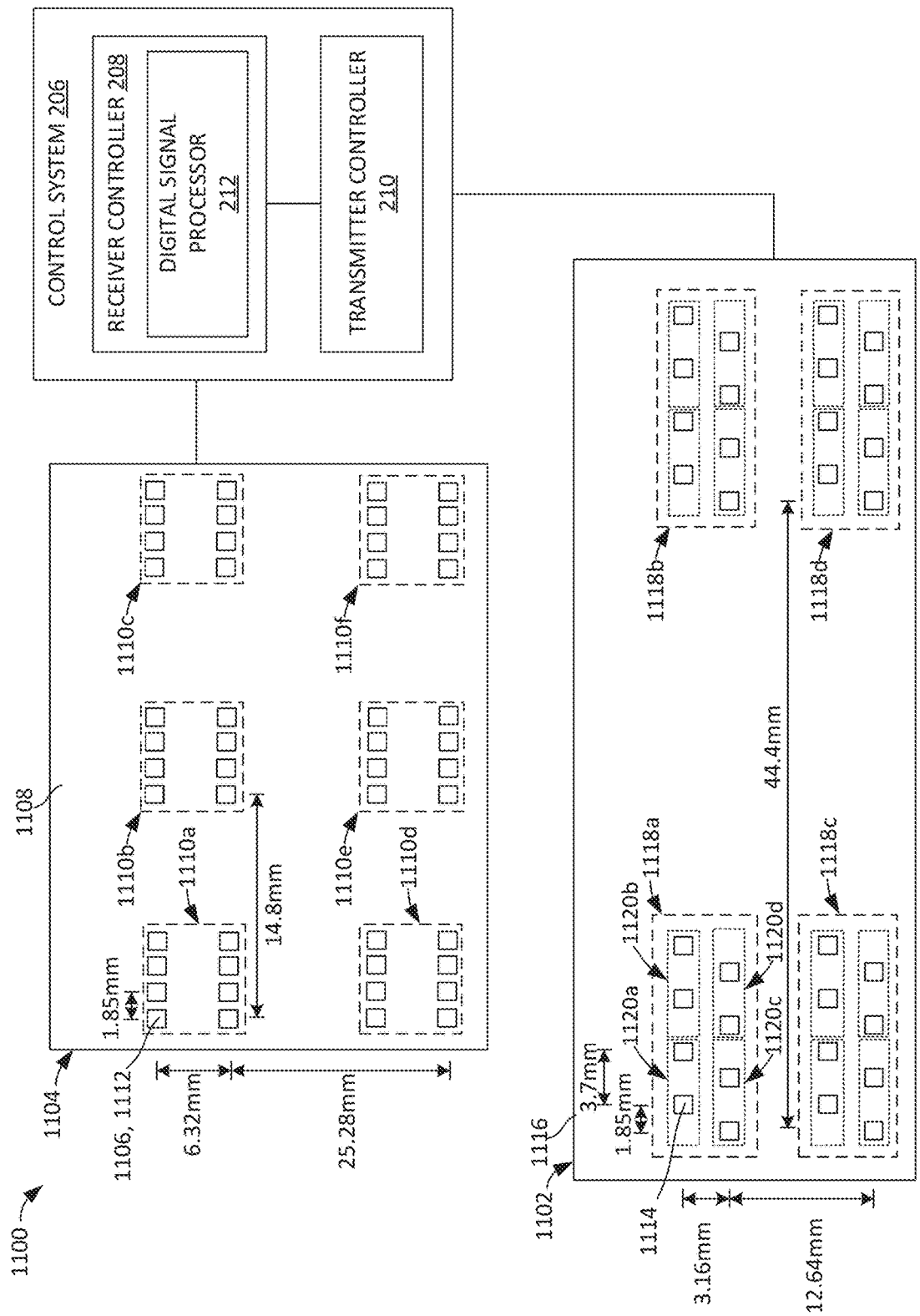
FIG. 11 illustrates another example MIMO radar sensor having an example transmitter module and an example receiver module constructed in accordance with the teachings of this disclosure.

FIG. 11 illustrates another example MIMO radar sensor 1100 (referred to herein as the radar sensor 1100) that may be implemented with the vehicle 100 of FIG. 1. The example radar sensor 1100 is similar to the radar sensor 200 of FIG. 2 and can operate in multiple modes, such as a MRR mode and a LLR mode. However, in this example, the transmitter antenna elements of the transmitter chains are offset from each other in the vertical direction, which enables the use of physically larger transmitter antenna elements with higher gains, by increasing the vertical size of the transmitter antenna element. For example, the transmitter antenna elements may be implemented as larger antenna elements such as the antenna element 1002 of FIG. 10B or the antenna element 1004 of FIG. 10C instead of smaller antenna elements such as the antenna element 1000 of FIG. 10A.

In the illustrated example of FIG. 11, the radar sensor 1100 includes a transmitter module 1102 and a receiver module 1104. As shown in FIG. 11, the same control system 206 is implemented for controlling the transmitter module 1102 and the receiver module 1104. Similar to the receiver module 204 of FIG. 2, the receiver module 1104 has an array of receiver antenna elements 1106 (one of which is referenced in FIG. 11) coupled to or embedded in a substrate 1108 (e.g., a PCB). The receiver antenna elements 1106 are passive antennas that receive echoed radar signals. In some examples, the receiver antenna elements 1106 are high gain antennas having a gain of 9.5 dBi. The receiver module 1104 of FIG. 11 is substantially the same as the receiver module 204 of the radar sensor 200 of FIG. 2, except the receiver module 1104 does not include the bottom row of receiver subarrays. In this example, the receiver module 1104 has a six receiver subarrays 1110a-1110f arranged in a 2×3 grid. Similar to the receiver module 204 of FIG. 2, each of the receiver subarrays 1110a-1110f has eight receiver chains 1112 (one of which is referenced in FIG. 11) of one receiver antenna element 1106. The horizontal and vertical spacings between the receiver antenna elements 1106 within each of the receiver subarrays 1110a-1110f and between the receiver subarrays 1110a-1110f is the same as disclosed above in connection with the receiver module 204 of FIG. 2.

Similar to the transmitter module 202 of FIG. 2, the transmitter module 1102 includes an array of transmitter antenna elements 1114 (one of which is referenced in FIG. 11) coupled to or embedded in a substrate 1116 (e.g., a PCB). The transmitter antenna elements 1114 are active antenna elements that transmit radar signals. In some examples, the transmitter antenna elements 1114 are high gain antenna elements (e.g., more than 8 dBi). For example, each of the transmitter antenna elements 1114 may have a gain of 9.5 dBi. In other examples, the transmitter antenna elements 1114 may have higher or lower gains. The transmitter antenna elements 1114 are grouped together in four transmitter subarrays 1118a-1118d arranged in a 2×2 grid. Further, the transmitter antenna elements 1114 are grouped into transmitter chains in each of the transmitter subarrays 1118a-1118-d. In particular, each of the transmitter subarrays 1118a-1118d has four transmitter chains 1120a-1120d (only labeled in the first transmitter subarray 1118a). Thus, the transmitter module 1102 has 16 transmitter chains. As a result, the example radar sensor 1100 can generate 768 virtual MIMO channels (16 transmitter chains*48 receiver chains=768). However, in this example, each of the transmitter chains 1120a-1120d is formed by two of the transmitter antenna elements 1114 instead of four. The transmitter antenna elements 1114 in the top (first) row are horizontally offset from the transmitter antenna elements 1114 in the bottom (second) row to enable the use larger vertical dimension antenna elements (with higher gains) and prevent overlapping. The horizontal and vertical spacings are shown in FIG. 11. The example arrangement and spacings shown in FIG. 11 enable the transmitter module 1102 to operate in a MRR mode and a LRR mode while creating the same virtual MIMO geometry array.

Figure 12:
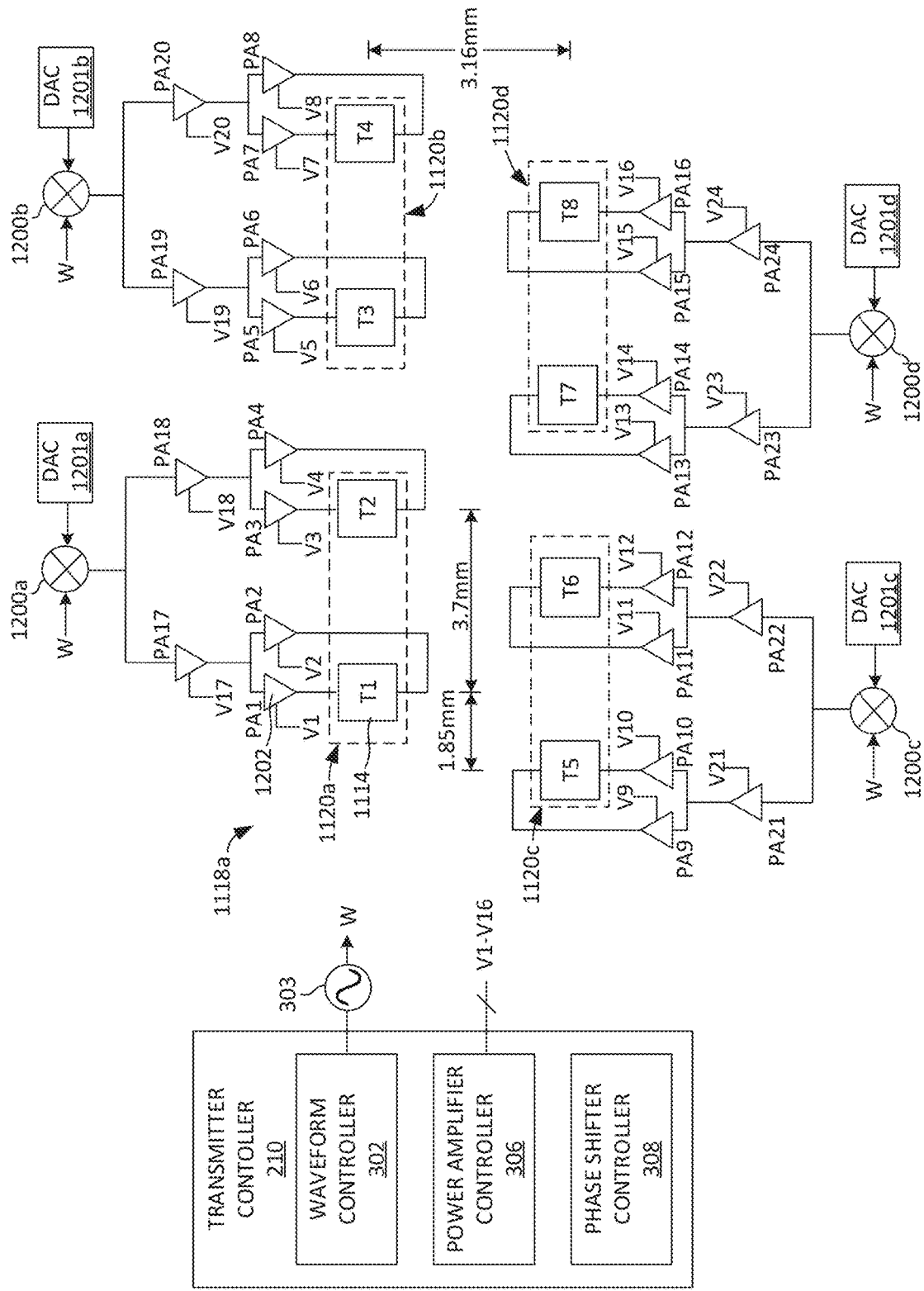
FIG. 12 is a schematic of an example transmitter subarray of the example transmitter module of FIG. 11.

FIG. 12 is a schematic of the first transmitter subarray 1118a. The second, third, and fourth transmitter subarrays 1118b-1118d are structured the same and configured to operate the same as the first transmitter subarray 1118a. Thus, any of the aspects disclosed below in connection with the first transmitter subarray 1118a can likewise apply to the second, third, and fourth transmitter subarrays 1118b-1118d.

The first transmitter subarray 1118a of FIG. 12 has four transmitter chains 1120a-1120d, each with two transmitter antenna elements 1114 (one of which has been referenced in FIG. 11). Thus, the first transmitter subarray 1118a has 8 transmitter antenna elements 1114. The transmitter antenna elements 1114 have been number T1-T8. In this example, the antenna elements T1-T8 are high gain antennas. In some examples, the transmitter antenna elements T1-T8 are high gain antennas having a gain of 9.5 dBi. Transmitter antenna elements T1 and T2 form the first transmitter chain 1120a, transmitter antenna elements T3 and T4 form the second transmitter chain 1120b, transmitter antenna elements T5 and T6 form the third transmitter chain 1120c, and transmitter antenna elements T7-T8 form the fourth transmitter chain 1120d.

In the illustrated example, the transmitter antenna elements T1-T8 are arranged in two rows of four antenna elements. The first and second transmitter chains 1120a, 1120b form the top row and the third and fourth transmitter chains 1120c, 1120d form the bottom row. Each of the transmitter antenna elements T1-T8 is horizontally spaced from an adjacent antenna element by two times (2×) the horizontal pitch, which is about one wavelength (e.g., ±0.02), which is 3.7 mm (twice the distance as in FIGS. 2 and 3). The top row of transmitter antenna elements T1-T4 is vertically spaced from the bottom row of transmitter antenna elements T5-T8 by the vertical pitch, which is about 0.8λ, which is 3.16 mm (same as in FIGS. 2 and 3). In this example, the top and bottom rows of antenna elements are horizontally offset by the horizontal pitch of 1.85 mm (half the distance between two adjacent antenna elements). In other words, the top and bottom rows of transmitter antenna elements are not vertically aligned. This enables the use of transmitter antenna elements that are larger in the vertical direction and that have higher gain in the elevation direction without overlapping. For example, each of the transmitter antenna elements T1-T8 may be implemented as the antenna element 1004 of FIG. 10C.

The transmitter antenna elements of each of the transmitter chains 1120a-1120d are driven by a common signal. Each of the transmitter chains 1120a-1120d are driven by different, orthogonal signal. To achieve this orthogonality, the example radar senor 1100 includes respective mixers 1200a-1200d and digital-to-analog converters (DACs) 1201a-1201d associated with each of the transmitter chains 1120a-1120d. The local oscillator 1203 outputs a local signal or waveform W. The local signal W is received by each of the mixers 1200a-1200d and mixed with the respective signals from the DACs 1201a-1201d, which produces orthogonal RF signals for each of the transmitter chains 1120a-1120d. Therefore, each of the transmitter chains 1120a-1120d is driven by a signal that is orthogonal to the other transmitter chains 1120a-1120d. In other examples, instead of using the local oscillator 303, four separate oscillators may be used to produce the four signals for the respective transmitter chains 1120a-1120d. The waveform controller 302 controls and/or selects the signal/waveform to be output by the local oscillator 303. In some examples, the waveform controller 302 also controllers the mixers 1200a-1200d and/or the DACs 1201a-1201d to produce the desired orthogonal signals.

In the illustrated example of FIG. 12, the first transmitter subarray 1118a includes two parallel power amplifiers 1202 (one of which is referenced in FIG. 11) associated with each of the transmitter antenna elements T1-T8. The power amplifiers have been numbered PA1-PA16. The transmitter antenna elements T1-T16 are activated and deactivated by activating and deactivating the corresponding pairs of the power amplifier PA1-PA16. For example, when the power amplifiers PA1 and PA2 are activated, the power amplifiers PA1 and PA2 amplify the signal from the first signal generator 1200a and provide the amplified signal to the first transmitter antenna element T1. As shown in FIG. 12, in this example, additional power amplifiers T17-24 (sometimes referred to as drive amplifiers) are provided upstream from the parallel pairs power amplifiers PA1-PA16. The power amplifiers PA1-PA24 may be turned ON or OFF by applying or ceasing a voltage signal V1-V24, which is controlled by the power amplifier controller 306. The power amplifier controller 306 turns the individual power amplifiers PA1-PA24 ON and OFF to switch between the MRR mode and LRR mode.

Similar to the transmitter module 202 of FIG. 2, the transmitter module 1102 is capable of operating in a MRR mode and a LRR mode. In some examples, the transmitter controller 210 controls the transmitter chains to switch or alternate (e.g., at a predetermined frequency) between operating in the MRR mode and the LRR mode.

In the MRR mode, a first set of the transmitter antenna elements of each of the transmitter chains 1120a-1120d is activated. The activated transmitter antenna element(s) is/are in the same corresponding position (e.g., the left transmitter antenna element) in each of the transmitter chains 1120a-1120d is activated. In some examples, the first set of transmitter antenna elements to be activated in the MMR mode is one. For example, in the MRR mode, the first, third, fifth, and seventh transmitter antenna elements T1, T3, T5, and T7 are activated. In such an example, the other transmitter antenna elements T2, T4, T6, T8 are not activated. Therefore, in the MRR mode, a phase center of the first transmitter chain 1120a is at the center of the first transmitter antenna element T1, a phase center of the second transmitter chain 1120b is at the center of the third transmitter antenna element T3, a phase center of the third transmitter chain 1120c is at the center of the fifth transmitter antenna element T5, and a phase center of the fourth transmitter chain 1120d is at the center of the seventh transmitter antenna element T7. As such, the horizontal distance between the phase centers of the first and second transmitter chains 1120a, 1120b the two time (2×) the horizontal pitch, which is 7.4 mm (same for the third and fourth transmitter chains 1120c, 1120d), and the vertical distance between the phase centers of the first and second transmitter chains 1120a, 1120b (the top row) and the third and fourth transmitter chains 1120c, 1120d (the bottom row) is the vertical pitch, which is 3.16 mm.

In the LRR mode, a second set of the transmitter antenna elements of each of the transmitter chains 1120a-1120d are activated. In some examples, the second set of the transmitter antenna elements is larger or greater than the first set of the transmitter antenna elements activated during the MRR. For example, the second set of transmitter antenna elements to be activated in the LLR mode is all of the available transmitter antenna elements of each of the transmitter chains 228a-228d. For example, in the LRR mode, transmitter antenna elements T1 and T2 are activated and emit the same signal from the first signal generator 1200a, transmitter antenna elements T3 and T4 are activated and emit the same signal from the second signal generator 1200b, transmitter antenna elements T5 and T6 are activated and emit the same signal from the third signal generator 1200c, and transmitter antenna elements T7 and T8 are activated and emit the same signal from the fourth signal generator 1200d. In the LRR mode, a phase center of the first transmitter chain 1120a is midway between the first and second transmitter antenna elements T1 and T2, a phase center of the second transmitter chain 1120b is midway between the third and fourth transmitter antenna elements T3 and T4, a phase center of the third transmitter chain 1120c is midway between the fifth and sixth transmitter antenna elements T5 and T6, and a phase center of the fourth transmitter chain 1120d is midway between the seventh and eighth transmitter antenna elements T7 and T8. As a result, the relative distances between the phase centers of the transmitter chains 1120a-1120d in the LRR mode is the same as in the MRR mode. In particular, the horizontal distance between the phase centers of the first and second transmitter chains 1120a, 1120b is two times (2×) the horizontal pitch, which is 7.4 mm (same for the third and fourth transmitter chains 1120c, 1120d), and the vertical distance between the phase centers of the first and second transmitter chains 1120a, 1120b (the top row) and the third and fourth transmitter chains 1120c, 1120d (the bottom row) is the vertical pitch, which is 3.16 mm. The phase centers from the LRR mode are merely shifted from the phase centers from the MRR mode.

Assume, for example, each of the transmitter antenna elements T1-T8 is a high gain antenna having a gain of 9.5 dBi. In the MRR mode, only the first and second power amplifiers PA1 and PA2 of the first transmitter antenna element T1 are activated. Therefore, using Equation 1, the total gain for the first transmitter chain 1120a in the MRR mode is 12.5 db (9.5 dBi+10*log 10(2)+10*log 10(1)=12.5 db). The other transmitter chains 1120b-1120d similarly have a gain of 12.5 db in the MRR. In the LRR, all four of the power amplifiers PA1-PA4 of the first transmitter chain 1120a are activated and both of the transmitter antenna elements T1 and T2 are activated. Therefore, the total gain for the first transmitter chain 1120a in the LRR mode is 18.5 db (9.5+10*log 10(4)+10*log 10(2)=18.5 db). As such, compared to the arrangement of FIGS. 2 and 3, the arrangement of FIG. 11 has a higher gain for the MRR mode (from 6.5 db to 12.5 db), whereas the LRR mode stays the same. Thus, the example transmitter module 1102 has improved performance in the MRR mode. In particular, the MRR detection range increases by about 1.4, as a result of the 6 dB EIRP increase, compared to the transmitter module 202 of the radar sensor 200 of FIG. 2.

Table 3 below shows the ON/OFF configuration for the power amplifiers PA1-PA16 and the antenna elements T1-T8 in the MRR mode and the LRR mode.

TABLE 3

| TX Chain | PA Path | TX Antenna Element | MRR PA State | LRR PA State |
|---|---|---|---|---|
| TX#1 | PA1 | T1 | On | On |
|  | PA2 |  | On | On |
|  | PA3 | T2 | Off | On |
|  | PA4 |  | Off | On |
| TX#2 | PA5 | T3 | On | On |
|  | PA6 |  | On | On |
|  | PA7 | T4 | Off | On |
|  | PA8 |  | Off | On |
| TX#3 | PA9 | T5 | On | On |
|  | PA10 |  | On | On |
|  | PA11 | T6 | Off | On |
|  | PA12 |  | Off | On |
| TX#4 | PA13 | T7 | On | On |
|  | PA14 |  | On | On |
|  | PA15 | T8 | Off | On |
|  | PA16 |  | Off | On |

As shown in Table 3, during MRR mode, only the power amplifiers PA1, PA2, PA5, PA6, PA9, PA10, PA13, and PA14 for transmitter antenna elements T1, T3, T5, and T7 are activated, and the other power amplifiers are off. During LRR mode, all of the power amplifiers PA1-PA16 are activated.

In some examples, the transmitter controller 210 controls the transmitter module 202 to switch or alternate between the MRR mode and the LRR mode at a particular frequency. For example, the transmitter module 1102 may operate in the MRR mode for a first period of time, wait for a second period of time (e.g., while the receiver module 1104 receives and processes the radar signals), operate in the LRR mode for a third period of time, and wait again for a fourth period of time (e.g., while the receiver module 1104 receives and processes the radar signals). This cycle may be repeated at a particular frequency. In some examples, the time periods of activation for the MRR mode, the LRR mode, and the listening are all the same (e.g., 20 ms). In other examples, the time periods may be different.

As disclosed above in connection with the radar sensor 200, in other examples, the first set and the second set of transmitter antenna elements that are activated in the MRR mode and the LRR mode, respectively, may include more or fewer transmitter antenna elements. Additionally or alternatively, the first and second transmitter antenna elements may overlap, partially overlap, or not overlap.

Figure 13:
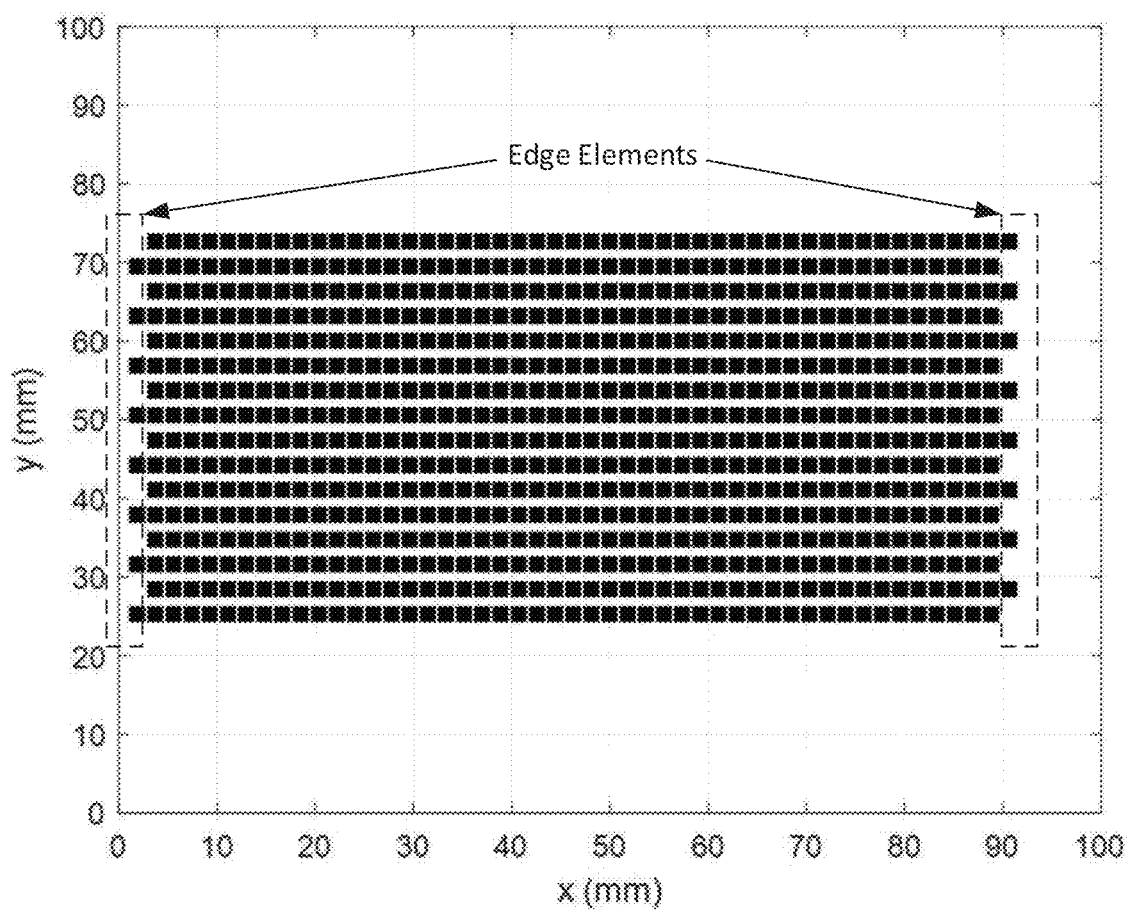
FIG. 13 is a graph showing a virtual MIMO array geometry with edge elements generated by the example MIMO radar sensor of FIG. 11.

FIG. 13 is a graph showing the resulting virtual MIMO array geometry produced by the radar sensor 1100. This array geometry is the same for the MRR mode and the LRR mode but may be shifted horizontally, similar to the shift seen in FIGS. 5A and 5B. As shown in FIG. 13, there are 16 virtual edge elements spaced at two-times (2×) the Nyquist spacing. The other elements are all below the Nyquist spacing. The 2× spacing of the edge elements has nearly no impact on the virtual array performance. Impact is negligible on side lobe level, with or without the edge elements. Impact is only −0.1 dB on the digital beamforming (DBF) processing gain (1536 vs. 1520), with or without the edge elements.

The element 3D pattern of the field of view produced by the transmitter module 1102 in the MRR mode and LRR mode is the same as in FIGS. 6A and 6B.

Figure 14A:
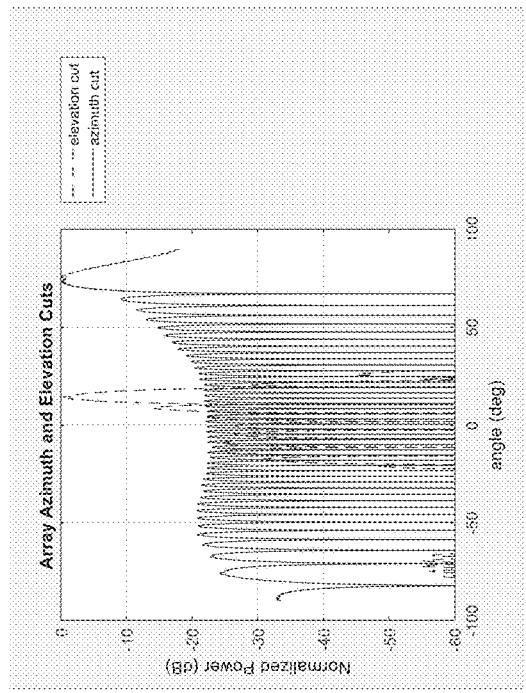
FIG. 14A is a graph showing an array 3D pattern generated by the example MIMO radar sensor of FIG. 11 operating in a mid-range radar mode with a digital beamforming at +75° azimuth and +15° elevation, with the edge elements of FIG. 13 omitted.
Figure 14B:
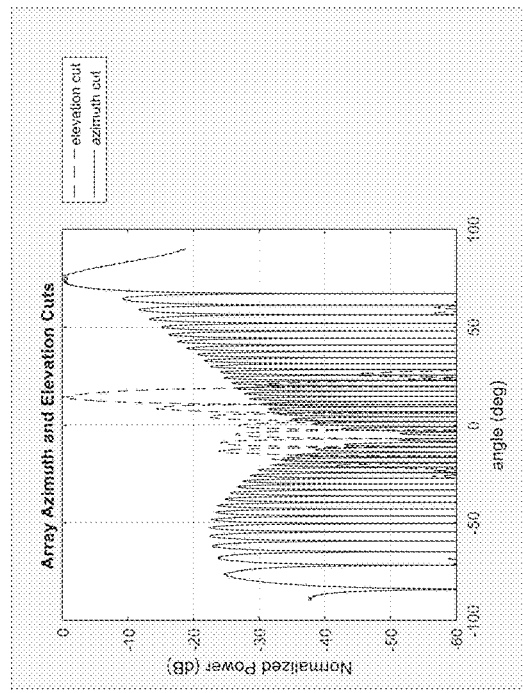
FIG. 14B is a graph showing the array azimuth and elevation cuts corresponding to the array 3D pattern of FIG. 14A.

FIG. 14A is a graph showing a 3D beam pattern generated by the radar sensor 1100 in the MRR mode with a digital beamforming at +75° azimuth and +15° elevation, with the edge elements of FIG. 13 omitted. FIG. 14B is a corresponding graph of the 2D beam pattern cuts for azimuth and elevation.

Figure 15A:
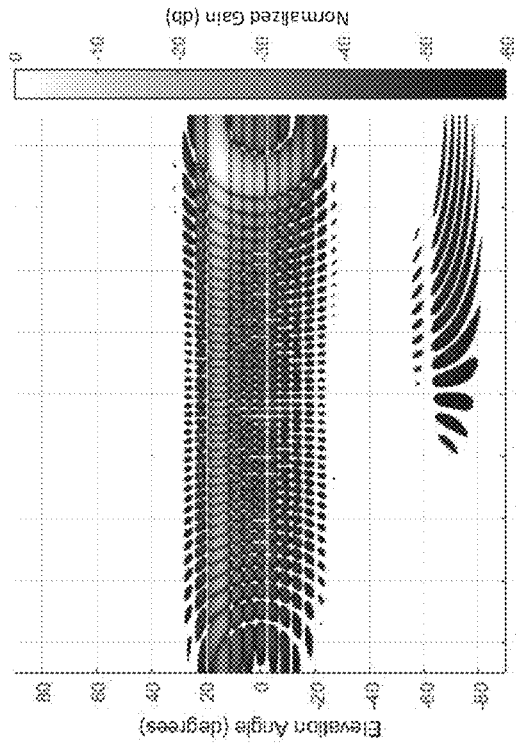
FIG. 15A is a graph showing an array 3D pattern generated by the example MIMO radar sensor of FIG. 11 operating in a mid-range radar mode with a digital beamforming at +75° azimuth and +15° elevation, with the edge elements of FIG. 13 included.
Figure 15B:
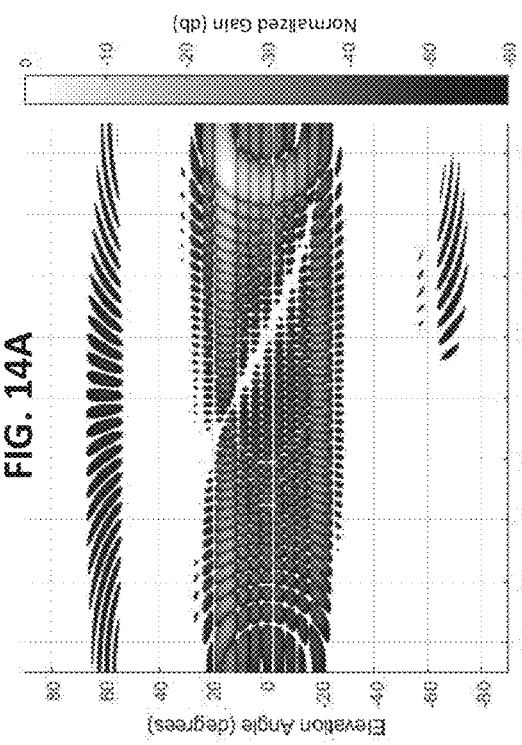
FIG. 15B is a graph showing the array azimuth and elevation cuts corresponding to the array 3D pattern of FIG. 15A.

FIG. 15A is a graph showing a 3D beam pattern generated by the radar sensor 1100 in the MRR mode with a digital beamforming at +75° azimuth and +15° elevation, with the edge elements of FIG. 13 included. FIG. 15B is a corresponding graph of the 2D beam pattern cuts for azimuth and elevation.

Figure 16A:
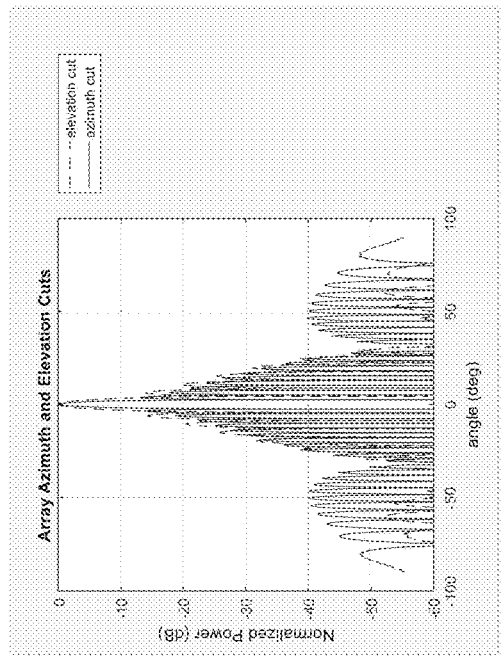
FIG. 16A is a graph showing an array 3D pattern generated by the example MIMO radar sensor of FIG. 11 operating in a long-range radar mode with a digital beamforming at 0° azimuth and 0° elevation, with the edge elements of FIG. 13 omitted.
Figure 16B:
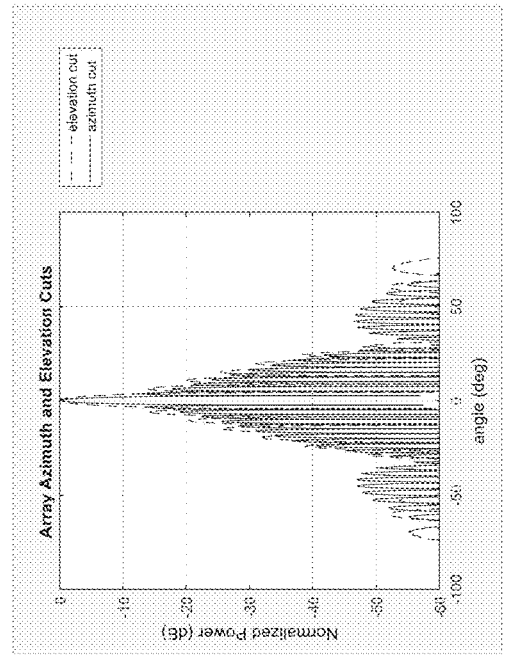
FIG. 16B is a graph showing the array azimuth and elevation cuts corresponding to the array 3D pattern of FIG. 16A.

FIG. 16A is a graph showing a 3D beam pattern generated by the radar sensor 1100 in the LRR mode with a digital beamforming at 0° azimuth and +0° elevation, with the edge elements of FIG. 13 omitted. FIG. 16B is a corresponding graph of the 2D beam pattern cuts for azimuth and elevation.

Figure 17A:
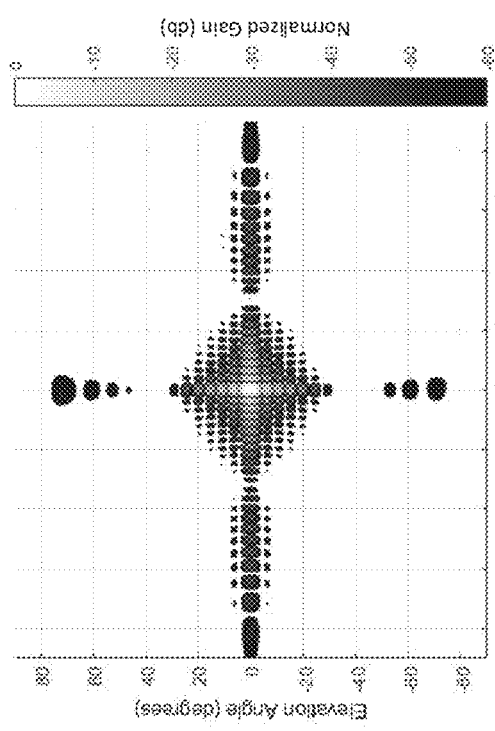
FIG. 17A is a graph showing an array 3D pattern generated by the example MIMO radar sensor of FIG. 11 operating in a long range radar mode with a digital beamforming at 0° azimuth and 0° elevation, with the edge elements of FIG. 13 included.
Figure 17B:
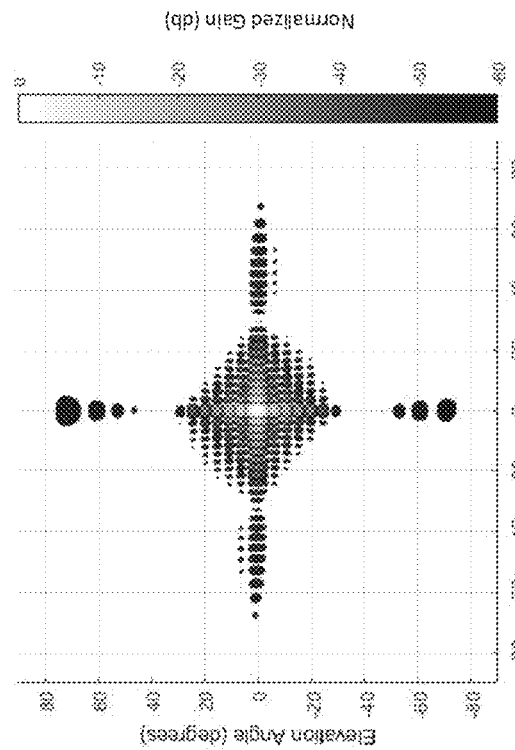
FIG. 17B is a graph showing the array azimuth and elevation cuts corresponding to the array 3D pattern of FIG. 17A.

FIG. 17A is a graph showing a 3D beam pattern generated by the radar sensor 1100 in the LRR mode with a digital beamforming at 0° azimuth and 0° elevation, with the edge elements of FIG. 13 included. FIG. 17B is a corresponding graph of the 2D beam pattern cuts for azimuth and elevation.

As can be understood from FIGS. 14A, 14B, 15A, 15B, 16A, 16B, 17A, 17B, there are no noticeable grating lobes, which means that a target can be unambiguously detected in the angular domain. Grating lobes can lead to false targets. Further, the impact on overall side lobe level is negligible, with or without considering the edge elements (FIG. 13). In some instances, adding the edge elements introduces a side lobe filter in azimuth (e.g., see the null near 0° azimuth in FIG. 15B compared to FIG. 14B), which further enhances the radar detection capability in the angular domain.

While an example manner of implementing the control system 206 is illustrated in FIGS. 2, 3, 11, and 12, one or more of the elements, processes and/or devices illustrated in FIGS. 2, 3, 11, and 12 may be combined, divided, re-arranged, omitted, eliminated and/or implemented in any other way. Further, the example receiver controller 208, the example digital signal processor 212, the example transmitter controller 210, the example waveform controller 302, the example power amplifier controller 306, the example phase shifter controller 308, and/or, more generally, the example control system 206 of FIGS. 2, 3, 11, and 12 may be implemented by hardware, software, firmware and/or any combination of hardware, software and/or firmware. Thus, for example, any of the example receiver controller 208, the example digital signal processor 212, the example transmitter controller 210, the example waveform controller 302, the example power amplifier controller 306, the example phase shifter controller 308 and/or, more generally, the example control system 206 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver controller 208, the example digital signal processor 212, the example transmitter controller 210, the example waveform controller 302, the example power amplifier controller 306, and/or the example phase shifter controller 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system 206 of FIGS. 2, 3, 11, and 12 may include one or more elements, processes and/or devices in addition to, or instead of, those illustrated in FIGS. 2, 3, 11, and 12, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 18:
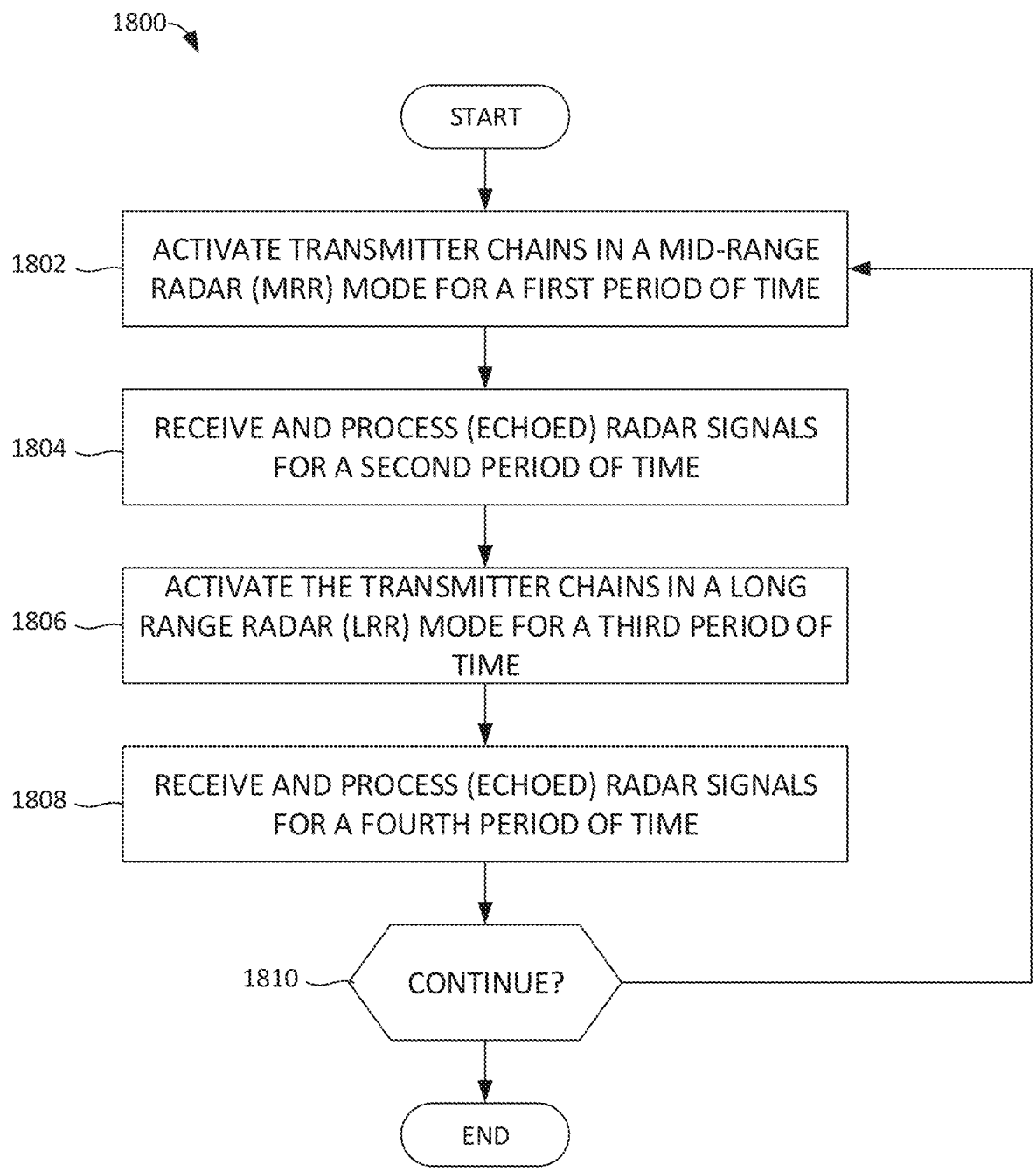
FIG. 18 is a flowchart representative of machine readable instructions that may be executed to implement an example control system of the example MIMO radar sensors of FIGS. 2 and 11.

A flowchart representative of example hardware logic, machine readable instructions, hardware implemented state machines, and/or any combination thereof for implementing the control system 206 of FIGS. 2, 3, 11, and 12 is shown in FIG. 18. The machine readable instructions may be one or more executable programs or portion(s) of an executable program for execution by a computer processor such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart illustrated in FIG. 18, many other methods of implementing the example control system 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 18 is a flowchart representative of example machine readable instructions that may be executed to implement the control system 206. The process 1800 is described in connection with the radar sensor 200 of FIG. 2. However, it is understood that the example process 2000 can be similarly implemented in connection with the radar sensor 1100 of FIG. 11.

At block 1802, the transmitter controller 210 of the control system 206 activates the transmitter chains 228a-228d (as well as the other transmitter chains of the other transmitter subarrays) in the MRR mode for a first period of time (e.g., 20 ms). In some examples, the power amplifier controller 306 activates certain ones of the power amplifiers PA1-PA16 in accordance with the MRR mode. For example, in reference to FIG. 3, the power amplifier controller 306 may activate a first set of the transmitter antenna elements (e.g., one transmitter antenna element) of each of the transmitter chains 228a-228d. For example, the power amplifier controller 306 may activate the transmitter antenna elements T1, T5, T9, and T13, while the remaining transmitter antenna elements remain deactivated. The same applies for the transmitter chains of the other transmitter subarrays 226b-226d. The power amplifier controller 306 may deactivate the transmitter antenna elements T1, T5, T9, and T13 (as well as the other corresponding transmitter antenna elements of the other transmitter subarrays) after the first period of time.

After the signals are transmitted from the transmitter module 202 for the first period of time, the receiver module 204, at block 1804, listens and receives the echoed radar signals for a second period of time (e.g., 20 ms). The echoed radar signals are received by the receiver antenna elements 214 of the receiver module 204 and are processed by the digital signal processor 212 of the receiver controller 208. The digital signal processor 212 processes the signals to detect and measure range, velocity, and/or bearing of objects in the field of view.

At block 1806, the transmitter controller 210 of the control system 206 activates the transmitter chains 228a-228d (as well as the other transmitter chains of the other transmitter subarrays) in the LRR mode for a third period of time (e.g., 20 ms). In some examples, the power amplifier controller 306 activates certain ones of the power amplifiers in accordance with the LRR mode for a third period of time (e.g., 20 ms). In the LRR mode, the power amplifier controller 306 may activate a second set of the transmitter antenna elements (e.g., all of the transmitter antenna elements) of each of the transmitter chains 228a-228d, where the second set is larger or greater than the second set. For example, the power amplifier controller 306 may activate all of the power amplifiers T1-T16 to turn on all of the transmitter antenna elements T1-T16. The same applies for the transmitter chains of the other transmitter subarrays 226b-226d. The power amplifier 306 may deactivate the transmitter antenna elements T1-T16 (as well as the transmitter antenna elements of the other transmitter subarrays) after the third period of time.

After the signals are transmitted from the transmitter module 202 for the third period of time, the receiver module 204, at block 1808, listens and receives the echoed radar signals for a fourth period of time (e.g., 20 ms). The echoed radar signals are received by the receiver antenna elements 214 of the receiver module 204 and are processed by the digital signal processor 212 of the receiver controller 208. The digital signal processor 212 processes the signals to detect and measure range, velocity, and/or bearing of objects in the field of view.

At block 1810, the control system 206 determines whether to continue sensing with the radar sensor 200. For example, if the vehicle 100 is turned off or idle (e.g., parked), the control system 206 may determine to cease operation and the example process 1800 ends. However, if the vehicle 100 is still running and moving, for example, control may proceed back to block 1802 and the example process 1800 is repeated. The example process 1800 may be repeated at a relatively high frequency. As such, the example control system 206 alternates between activating the transmitter chains in a first mode (e.g., the MRR mode) for a period of time and activating the transmitter chains in a second mode (e.g., the LRR mode) for a period of time. In some examples, the periods of time of activation are a same period of time (e.g., 20 ms). In other examples, the periods of time may be different (e.g., 20 ms in the MRR mode and 40 ms in the LRR mode).

Figure 19:
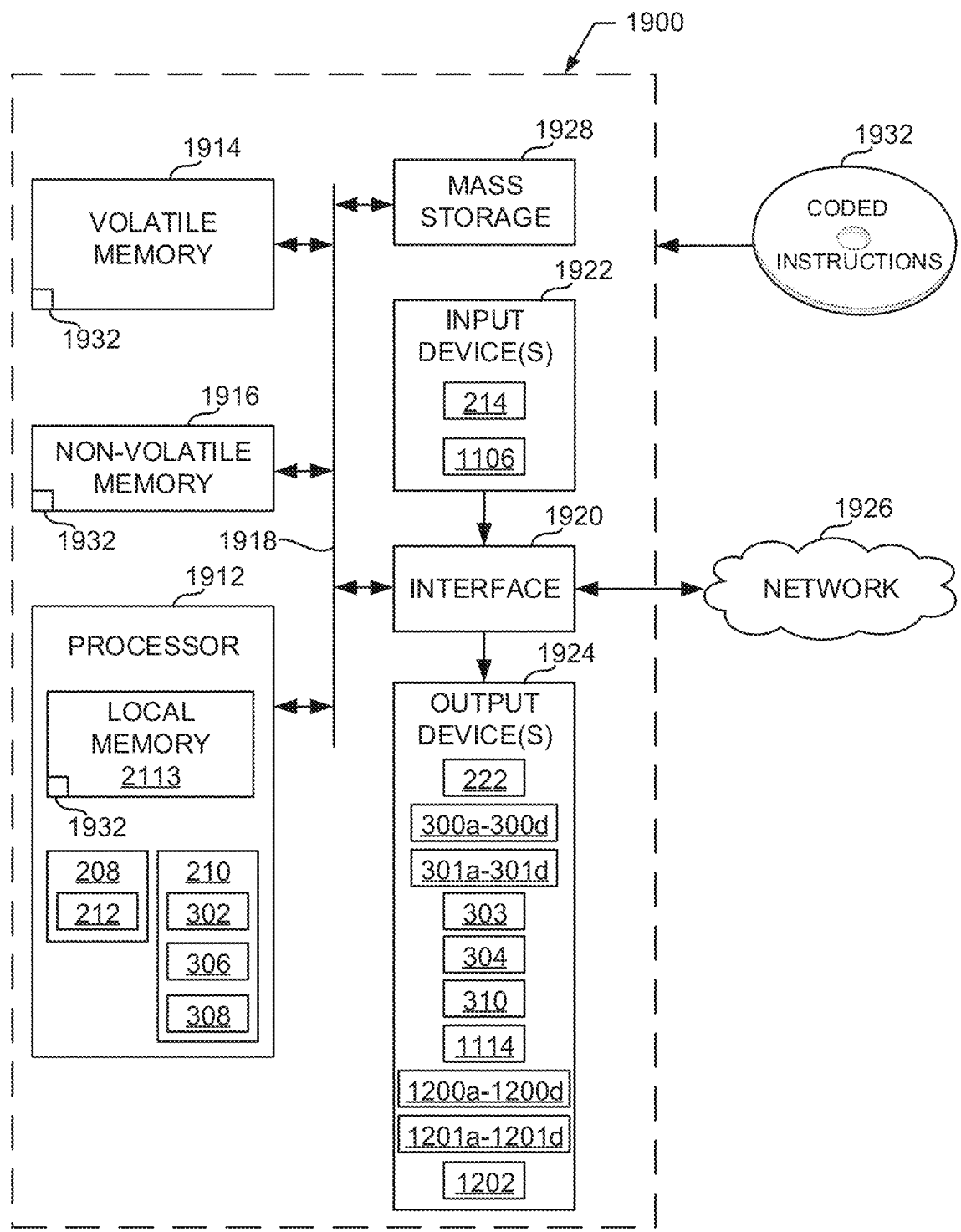
FIG. 19 is a block diagram of an example processing platform structured to execute the instructions of FIG. 18 to implement the control system of FIGS. 2 and 11.

FIG. 19 is a block diagram of an example processor platform 1900 structured to execute the instructions of FIG. 20 to implement the control system 206 of FIGS. 2, 3, 11, and 12. The processor platform 1900 can be, for example, a server, a personal computer, a workstation, a self-learning machine (e.g., a neural network), a mobile device (e.g., a cell phone, a smart phone, a tablet such as an iPad™), an Internet appliance, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1912 implements the receiver controller 208, the digital signal processor 212, the transmitter controller 210, the waveform controller 302, the power amplifier controller 306, and the phase shifter controller 308.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user and/or a device to enter data and/or commands into the processor 1912. In this example, the input device(s) 1922 may include the receiver antenna elements 214, 1106.

One or more output devices 1924 are also connected to the interface circuit 1920 of the illustrated example. In this example, the output device(s) 1924 may include the transmitter antenna elements 222, the mixers 300a-300d, the DACs 301a-301d, the local oscillator 303, the power amplifiers 304, the phase shifters 310, the transmitter antenna elements 1114, the mixers 1200a-1200d, the DACs 1201a-1201d, and/or the power amplifiers 1202. Additionally or alternatively, the output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, may include a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIG. 18 may be stored in the mass storage device 1928, in the volatile memory 1914, in the non-volatile memory 1916, and/or on a removable non-transitory computer readable storage medium such as a CD or DVD.

From the foregoing, it will be appreciated that example methods, apparatus and articles of manufacture have been disclosed that enable a MIMO radar sensor to be used multiple modes without adding additional high gain antennas as done in the known radar systems. In particular, example MIMO radar sensors disclosed herein have transmitter modules that can operate in both a MRR mode and a LRR mode using the same antenna elements. The same physical array of transmitters and receivers are used for all modes, which enables the size of the radar sensor board (e.g., a PCB) and the number of chains to remain the same for all modes. As such, example MIMO radar sensors disclosed herein are smaller, more compact, less expensive to manufacture than known radar sensors. Further, example MIMO radar sensors disclosed herein have reduced power consumption. Moreover, the example transmitter modules have better SNR than known radar sensors.

The following paragraphs provide various examples of the examples disclosed herein.

Example 1 includes a multi-input multi-output (MIMO) radar sensor that includes a receiver module including an array of receiver antenna elements to receive radar signals and a transmitter module including an array of transmitter antenna elements. Groups of the transmitter antenna elements form transmitter chains. Each of the transmitter chains is to be driven by a signal that is orthogonal to the other transmitter chains. The receiver antenna elements and the transmitter antenna elements are spaced to produce a predetermined horizontal pitch and a predetermined vertical pitch in a virtual array. The example MIMO radar sensor further includes a control system to, in a first mode, activate a first set of the transmitter antenna elements of each of the transmitter chains, and, in a second mode, activate a second set of the transmitter antenna elements of each of the transmitter chains. The second set is larger than the first set. The transmitter antenna elements are arranged such that distances between phase centers of the transmitter chains in the first mode and the second mode are the same.

Example 2 includes the MIMO radar sensor of Example 1, wherein the transmitter chains include a first transmitter chain and a second transmitter chain arranged in a horizontal row, and wherein, in the first mode and the second mode, a phase center of the first transmitter chain is horizontally spaced from a phase center of the second transmitter chain by four times the horizontal pitch.

Example 3 includes the MIMO radar sensor of Example 2, wherein the transmitter chains include a third transmitter chain disposed vertically below the first transmitter chain, and wherein, in the first mode and the second mode, the phase center of the first transmitter chain is vertically spaced from a phase center of the third transmitter chain by the vertical pitch.

Example 4 includes the MIMO radar sensor of Example 3, wherein the transmitter chains include a fourth transmitter chain arranged in a horizontal row with the third transmitter chain and disposed vertically below the second transmitter chain, and wherein, in the first mode and the second mode, the phase center of the third transmitter chain is horizontally spaced from a phase center of the fourth transmitter chain by four times the horizontal pitch, and the phase center of the second transmitter chain is vertically spaced from the phase center of the fourth transmitter chain by the vertical pitch.

Example 5 includes the MIMO radar sensor of Example 4, wherein the first, second, third, and fourth transmitter chains are arranged in a 2×2 grid.

Example 6 includes the MIMO radar sensor of Example 5, wherein the first, second, third, and fourth transmitter chains form a first transmitter subarray, further including a plurality of additional transmitter subarrays.

Example 7 includes the MIMO radar sensor of any of Examples 1-6, further including a plurality of power amplifiers associated with the respective ones of the transmitter antenna elements.

Example 8 includes the MIMO radar sensor of Example 7, wherein the control system is to activate the transmitter antenna elements by controlling a voltage to the respective ones of the power amplifiers.

Example 9 includes the MIMO radar sensor of any of Examples 1-8, wherein the control system is to alternate between activating the transmitter antenna elements in the first mode and the second mode.

Example 10 includes the MIMO radar sensor of any of Examples 1-9, wherein the receiver module is separate from the transmitter module.

Example 11 includes the MIMO radar sensor of any of Examples 1-10, wherein each of the transmitter chains includes four transmitter antenna elements arranged in a row.

Example 12 includes the MIMO radar sensor of Example 11, wherein the transmitter antenna elements of each of the transmitter chains is separated from an adjacent transmitter antenna element by the horizontal pitch.

Example 13 includes the MIMO radar sensor of Example 12, wherein each of the transmitter antenna elements is a low gain antenna.

Example 14 includes the MIMO radar sensor of any of Examples 1-10, wherein the transmitter antenna elements are arranged in a first row and a second row below the first row, and wherein the transmitter antenna elements in the first row are horizontally offset from the transmitter antenna elements in the second row.

Example 15 includes the MIMO radar sensor of Example 14, wherein the transmitter antenna elements of each of the transmitter chains is separated from an adjacent transmitter antenna element by two times the horizontal pitch.

Example 16 includes the MIMO radar sensor of claim 15, wherein each of the transmitter antenna elements is a high gain antenna.

Example 17 includes at least one non-transitory computer-readable medium including instructions that, when executed, cause at least one processor to at least alternate between activating transmitter chains of a transmitter module in a first mode for a first period of time and activating the transmitter chains in a second mode for a second period of time. Each of the transmitter chains has a plurality of transmitter elements. Each of the transmitter chains is to be driven by a signal that is orthogonal to the other transmitter chains. The transmitter chains are activated in the first mode by activating a first set of the transmitter antenna elements of each of the transmitter chains. The transmitter chains are activated in the second mode by activating a second set of the transmitter antenna elements of each of the transmitter chains. The second set is larger than the first set. The transmitter antenna elements arranged such that distances between phase centers of the transmitter chains in the first mode and the second mode are the same.

Example 18 includes the at least one non-transitory computer-readable medium of Example 17, wherein the instructions, when executed, cause the at least one processor to activate the transmitter antenna elements by controlling voltage to a plurality of power amplifiers associated with respective ones of the transmitter antenna elements.

Example 19 includes the at least one non-transitory computer-readable medium of Examples 17 or 18, wherein the first period of time and the second period of time are a same period of time.

Example 20 includes the at least one non-transitory computer-readable medium of any of Examples 17-19, wherein, between the first period of time and the second period of time, the instructions, when executed, cause the at least one processor to process echoed radar signals received by receiver antenna elements of a receiver module.

Example 21 includes a method including alternating, by executing an instruction with at least one processor, between activating transmitter chains of a transmitter module in a first mode for a first period of time and activating the transmitter chains in a second mode for a second period of time. Each of the transmitter chains has a plurality of transmitter elements. Each of the transmitter chains is to be driven by a signal that is orthogonal to the other transmitter chains. The transmitter chains are activated in the first mode by activating a first set of the transmitter antenna elements of each of the transmitter chains. The transmitter chains activated in the second mode by activating a second set of the transmitter antenna elements of each of the transmitter chains. The second set is larger than the first set. The transmitter antenna elements are arranged such that distances between phase centers of the transmitter chains in the first mode and the second mode are the same.

Example 22 includes the method of Example 21, wherein the activating of the transmitter chains includes controlling voltage to a plurality of power amplifiers associated with respective ones of the transmitter antenna elements.

Example 23 includes the method of Examples 21 or 22, wherein the first period of time and the second period of time are a same period of time.

Example 24 includes the method of any of Examples 21-23, further including, between activating the transmitter chains in the first mode and the second mode, processing echoed radar signals received by receiver antenna elements of a receiver module.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A multi-input multi-output (MIMO) radar sensor comprising:
    a receiver module including an array of receiver antenna elements to receive radar signals;
    a transmitter module including:
        a first transmitter chain including a first transmitter antenna element and a second transmitter antenna element; and
        a second transmitter chain including a third transmitter antenna element and a fourth transmitter antenna element, the receiver antenna elements and the transmitter antenna elements spaced to produce a predetermined horizontal pitch and a predetermined vertical pitch in a virtual array; and processor circuitry to:
in a first mode;
activate the first transmitter antenna element while the second transmitter antenna element is deactivated, the first transmitter antenna element activated by driving the first transmitter antenna element with a first signal; and
activate the third transmitter antenna element while the fourth transmitter antenna element is deactivated, the third transmitter antenna element activated by driving the third transmitter antenna element with a second signal that is orthogonal to the first signal; and
in a second mode;
activate both the first and second transmitter antenna elements of the first transmitter chain by driving the first and second transmitter antenna elements with the first signal; and
activate both the third and fourth transmitter antenna elements of the second transmitter chain by driving the third and fourth transmitter antenna elements with the second signal, the transmitter antenna elements arranged such that distances between phase centers of the first and second transmitter chains in the first mode and the second mode are the same.

2. The MIMO radar sensor of claim 1, wherein the first transmitter chain and the second transmitter chain arranged in a horizontal row, and wherein, in the first mode and the second mode, a phase center of the first transmitter chain is horizontally spaced from a phase center of the second transmitter chain by four times the horizontal pitch.

3. The MIMO radar sensor of claim 2, wherein the transmitter module includes a third transmitter chain disposed vertically below the first transmitter chain, and wherein, in the first mode and the second mode, the phase center of the first transmitter chain is vertically spaced from a phase center of the third transmitter chain by the vertical pitch.

4. The MIMO radar sensor of claim 3, wherein the transmitter module includes a fourth transmitter chain arranged in a horizontal row with the third transmitter chain and disposed vertically below the second transmitter chain, and wherein, in the first mode and the second mode, the phase center of the third transmitter chain is horizontally spaced from a phase center of the fourth transmitter chain by four times the horizontal pitch, and the phase center of the second transmitter chain is vertically spaced from the phase center of the fourth transmitter chain by the vertical pitch.

5. The MIMO radar sensor of claim 4, wherein the first, second, third, and fourth transmitter chains are arranged in a 2×2 grid.

6. The MIMO radar sensor of claim 5, wherein the first, second, third, and fourth transmitter chains form a first transmitter subarray, the transmitter module further including a plurality of additional transmitter subarrays.

7. The MIMO radar sensor of claim 1, further including first, second, third, and fourth power amplifiers associated with the respective ones of the transmitter antenna elements.

8. The MIMO radar sensor of claim 7, wherein the processor circuitry is to activate the transmitter antenna elements by controlling a voltage to the respective ones of the power amplifiers.

9. The MIMO radar sensor of claim 1, wherein the processor circuitry is to alternate between activating the transmitter antenna elements in the first mode and the second mode.

10. The MIMO radar sensor of claim 1, wherein the receiver module is separate from the transmitter module.

11. The MIMO radar sensor of claim 1, wherein each of the transmitter chains includes four transmitter antenna elements arranged in a row.

12. The MIMO radar sensor of claim 11, wherein the transmitter antenna elements of each of the transmitter chains is-separated from an adjacent transmitter antenna element by the horizontal pitch.

13. The MIMO radar sensor of claim 12, wherein each of the transmitter antenna elements is a low gain antenna.

14. The MIMO radar sensor of claim 1, wherein the first and second transmitter antenna elements of the first transmitter chain are arranged in a first row and the third and fourth transmitter antenna elements of the second transmitter chain are arranged in a second row below the first row, and wherein the first and second transmitter antenna elements in the first row are horizontally offset from the third and fourth transmitter antenna elements in the second row.

15. The MIMO radar sensor of claim 14, wherein the transmitter antenna elements of each of the transmitter chains is separated from an adjacent transmitter antenna element by two times the horizontal pitch.

16. The MIMO radar sensor of claim 15, wherein each of the transmitter antenna elements is a high gain antenna.

17. At least one non-transitory computer-readable medium comprising instructions that, when executed, cause at least one processor to at least:
alternate between activating first and second transmitter chains of a transmitter module in a first mode for a first period of time and activating the first and second transmitter chains in a second mode for a second period of time, the first transmitter chain including a first transmitter antenna element and a second transmitter antenna element, the second transmitter chain including a third transmitter antenna element and a fourth transmitter antenna element, the first and second transmitter chains to be driven by signals that are orthogonal to each other, the first and second transmitter chains activated in the first mode by activating the first and third transmitter antenna elements while the second and fourth transmitter antenna elements are deactivated, the first and second transmitter chains activated in the second mode by activating the first, second, third, and fourth transmitter antenna elements the transmitter antenna elements of the first set and being larger than the first set, the transmitter antenna elements arranged such that distances between phase centers of the first and second transmitter chains in the first mode and the second mode are the same.

18. The at least one non-transitory computer-readable medium of claim 17, wherein the instructions, when executed, cause the at least one processor to activate the transmitter antenna elements by controlling voltage to a plurality of power amplifiers associated with respective ones of the transmitter antenna elements.

19. The at least one non-transitory computer-readable medium of claim 17, wherein the first period of time and the second period of time are a same duration of time.

20. The at least one non-transitory computer-readable medium of claim 17, wherein, between the first period of time and the second period of time, the instructions, when executed, cause the at least one processor to process echoed radar signals received by receiver antenna elements of a receiver module.

21. A method comprising:
alternating, by executing an instruction with at least one processor, between activating first and second transmitter chains of a transmitter module in a first mode for a first period of time and activating the first and second transmitter chains in a second mode for a second period of time, the first transmitter chain including a first transmitter antenna element and a second transmitter antenna element, the second transmitter chain including a third transmitter antenna element and a fourth transmitter antenna element, the first and second transmitter chains to be driven by signals that are orthogonal to each other, the first and second transmitter chains activated in the first mode by activating the first and third transmitter antenna elements while the second and fourth transmitter antenna elements are deactivated, the first and second transmitter chains activated in the second mode by activating the first, second, third, and fourth transmitter antenna elements the transmitter antenna elements arranged such that distances between phase centers of the first and second transmitter chains in the first mode and the second mode are the same.

22. The method of claim 21, wherein the activating of the transmitter chains includes controlling voltage to power amplifiers associated with respective ones of the transmitter antenna elements.

23. The method of claim 21, wherein the first period of time and the second period of time are a same length of time.

24. The method of claim 21, further including, between activating the first and second transmitter chains in the first mode and the second mode, processing echoed radar signals received by receiver antenna elements of a receiver module.

25. The MIMO radar sensor of claim 1, wherein the first and third transmitter antenna elements are in a same relative position in the respective first and second transmitter chains, and the second and fourth transmitter antenna elements are in a same relative position in the respective first and second transmitter chains.

26. An apparatus comprising:
at least one memory;
instructions in the apparatus; and
processor circuitry to execute the instructions to:
alternate between activating first and second transmitter chains of a transmitter module in a first mode for a first period of time and activating the first and second transmitter chains in a second mode for a second period of time, the first transmitter chain including a first transmitter antenna element and a second transmitter antenna element, the second transmitter chain including a third transmitter antenna element and a fourth transmitter antenna element, the first and second transmitter chains to be driven by signals that are orthogonal to each other, the first and second transmitter chains activated in the first mode by activating the first and third transmitter antenna elements while the second and fourth transmitter antenna elements are deactivated, the first and second transmitter chains activated in the second mode by activating the first, second, third, and fourth transmitter antenna elements the transmitter antenna elements arranged such that distances between phase centers of the first and second transmitter chains in the first mode and the second mode are the same.

* * * * *